US012670572B2

(12) United States Patent
Ji et al.

(10) Patent No.: US 12,670,572 B2
(45) Date of Patent: Jun. 30, 2026

(54) IMAGE RECOGNITION METHOD AND SYSTEM WITH IMPROVED ACCURACY OF RECOGNIZING DEFECT, AND TRAINING METHOD AND AN ELECTRONIC DEVICE

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Chao Ji, Beijing (CN); Yaoping Wang, Beijing (CN); Hongxiang Shen, Beijing (CN); Ge Ou, Beijing (CN); Boran Jiang, Beijing (CN); Shuqi Wei, Beijing (CN); Chuqian Zhong, Beijing (CN); Pengfei Zhang, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 396 days.

(21) Appl. No.: 18/263,230

(22) PCT Filed: Nov. 30, 2021

(86) PCT No.: PCT/CN2021/134469
§ 371 (c)(1),
(2) Date: Jul. 27, 2023

(87) PCT Pub. No.: WO2023/097464
PCT Pub. Date: Jun. 8, 2023

(65) Prior Publication Data
US 2024/0303798 A1 Sep. 12, 2024

(51) Int. Cl.
*G06T 7/00* (2017.01)

(52) U.S. Cl.
CPC .. *G06T 7/0004* (2013.01); *G06T 2207/20021* (2013.01); *G06T 2207/20081* (2013.01);
(Continued)

(58) Field of Classification Search
CPC ............. G06T 7/73; G06T 2207/30108; G06T 7/0004; G06T 2207/20021;
(Continued)

(56) References Cited

U.S. PATENT DOCUMENTS

2016/0343121 A1* 11/2016 Hu .......................... G06T 7/001
2017/0192593 A1 7/2017 Cho et al.

FOREIGN PATENT DOCUMENTS

CN 107037919 A 8/2017
CN 108596226 A 9/2018
(Continued)

OTHER PUBLICATIONS

English Translation: CN-113409290-A (Year: 2021).*
(Continued)

*Primary Examiner* — Sumati Lefkowitz
*Assistant Examiner* — Aaron Joseph Sorrin
(74) *Attorney, Agent, or Firm* — DINSMORE & SHOHL LLP

(57) ABSTRACT

An image recognition method and system for a display panel, a training method, and an electronic device and a non-volatile computer-readable storage medium. The image recognition method includes: acquiring an image of a display panel, wherein the image includes gate lines extending in a first direction and data lines extending in a second direction, the gate lines and the data lines intersecting to define a plurality of sub-pixel regions, and the image further includes a defect pattern; and recognizing the defect pattern in the image by using an image recognition model to obtain defect information, wherein the defect information includes
(Continued)

at least one of a defect type or a defect position of the defect pattern, the image recognition model comprises a first attention model configured to learn a weight proportion of a feature of the defect pattern in the image.

19 Claims, 11 Drawing Sheets

(52) U.S. Cl.
CPC ............... *G06T 2207/20084* (2013.01); *G06T 2207/30121* (2013.01)

(58) Field of Classification Search
CPC . G06T 2207/20081; G06T 2207/20084; G06T 2207/30121; G06T 7/00; G01N 29/4445; G06V 40/1347
See application file for complete search history.

(56) References Cited

FOREIGN PATENT DOCUMENTS

| | | | | | |
|---|---|---|---|---|---|
| CN | 109583496 | A | | 4/2019 | |
| CN | 110009622 | A | | 7/2019 | |
| CN | 110232348 | A | | 9/2019 | |
| CN | 110390107 | A | | 10/2019 | |
| CN | 110533084 | A | | 12/2019 | |
| CN | 111179241 | A | | 5/2020 | |
| CN | 111310613 | A | * | 6/2020 | G06N 3/045 |
| CN | 111583225 | A | * | 8/2020 | G06F 18/253 |
| CN | 111598860 | A | | 8/2020 | |
| CN | 111680689 | A | | 9/2020 | |
| CN | 112070749 | A | | 12/2020 | |
| CN | 112070750 | A | | 12/2020 | |
| CN | 112381794 | A | | 2/2021 | |
| CN | 113158768 | A | | 7/2021 | |
| CN | 113269730 | A | | 8/2021 | |
| CN | 113409290 | A | * | 9/2021 | G06N 3/045 |
| KR | 101681947 | B1 | * | 12/2016 | G01N 21/8803 |

OTHER PUBLICATIONS

English Translation: KR-101681947-B1 (Year: 2016).*
English Translation: CN-111583225-A (Year: 2020).*
English Translation: CN-111310613-A (Year: 2020).*
Xueong, “Bert Models Diagram, Xueong”, <URL: https://blog.csdn.net/sueong/article/details/120163315>, Sep. 7, 2021.

* cited by examiner

S1: obtain an image of a display panel

S2: recognize a defect pattern in the image of the display panel by using an image recognition model to obtain defect information

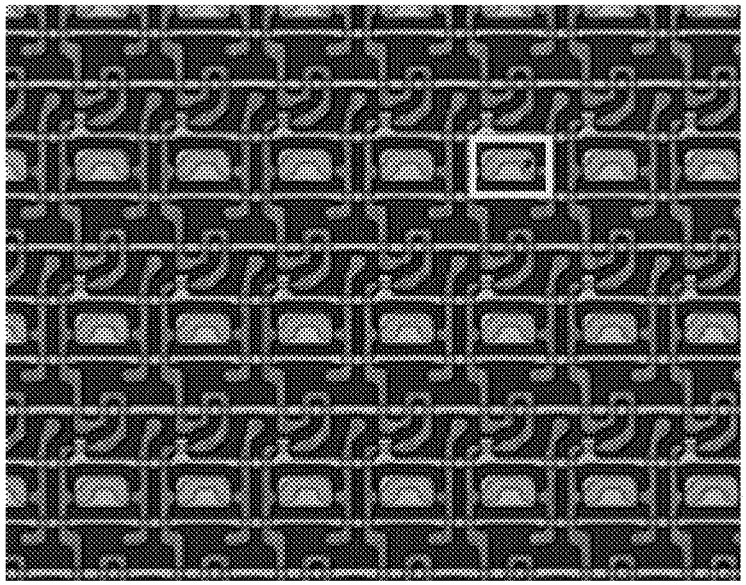

Fig. 2b

S21: perform dimensionality reduction processing on the image of the display panel to obtain a pixel encoding of the image of the display panel

↓

S22: determine a position encoding of the image of the display panel

↓

S23: determine a feature encoding of the image of the display panel based on the pixel encoding and the position encoding

↓

S24: process the feature encoding by using the first attention model to obtain an output of the first attention model

↓

S25: determine the defect information based on the output of the first attention model

Fig. 3

S81: perform linear transformation on a plurality of candidate boxes by using a second attention model to obtain a first vector matrix and a second vector matrix in the second attention model

↓

S82: determine a third vector matrix in the second attention model based on the first vector matrix and the second vector matrix in the second attention model

↓

S83: determine an output of the second attention model based on the third vector matrix in the second attention model

↓

S84: perform linear transformation on the output of the second attention model by using a third attention model to obtain a first vector matrix in the third attention model

↓

S85: perform linear transformation on the output of an encoding layer to obtain a second vector matrix in the third attention model

↓

S86: determine a third vector matrix in the third attention model based on the first vector matrix and the second vector matrix in the third attention model

↓

S87: determine an output of a decoding layer based on the third vector matrix in the third attention model

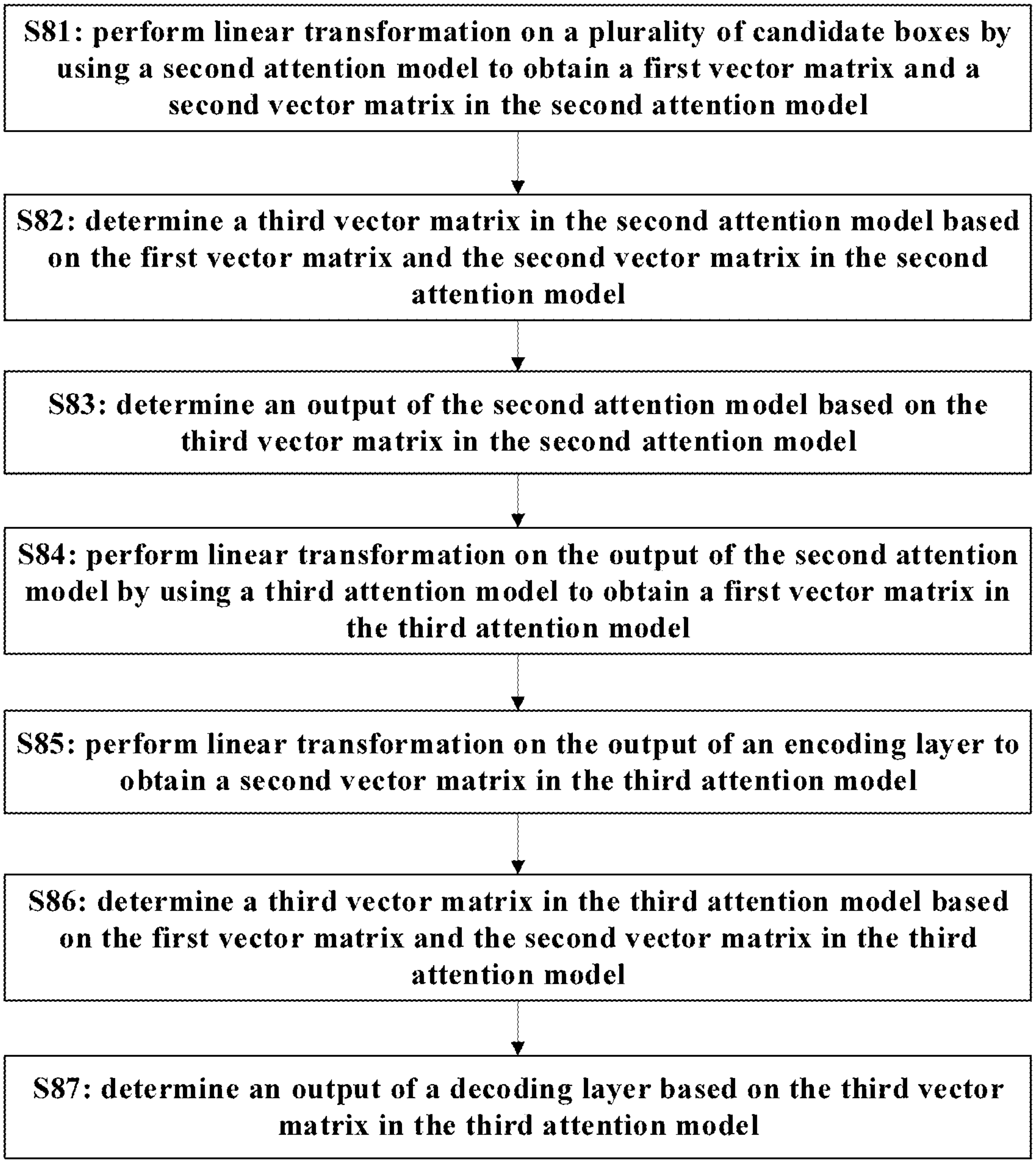

Fig. 8

S91: obtain an image of the display panel and annotation data of the image

S92: recognize a defect pattern in the image of the display panel by using an image recognition model to obtain defect information S93: train the image recognition model based on the defect information and the annotation data to obtain a trained image recognition model

10

Memory     101

Processor     102

IMAGE RECOGNITION METHOD AND SYSTEM WITH IMPROVED ACCURACY OF RECOGNIZING DEFECT, AND TRAINING METHOD AND AN ELECTRONIC DEVICE

CROSS-REFERENCE TO RELATED APPLICATIONS

The present application is a U.S. National Stage Application under 35 U.S.C. § 371 of International Patent Application No. PCT/CN2021/134469, filed on Nov. 30, 2021, the disclosure of which is incorporated by reference herein in its entirety.

TECHNICAL FIELD

The present disclosure relates to an image recognition method for a display panel and a system, a training method for an image recognition model, an electronic device, and a non-volatile computer-readable storage medium.

BACKGROUND

In the manufacturing process of a display panel such as a TFT-LCD (Thin Film Transistor Liquid Crystal Display) panel or an AMOLED (Active-matrix organic light-emitting diode) panel, various defects are easily caused in the flat panel display product due to the influence of equipment, manufacturing process, process environment, process material, or pixel layout design. For example, the various defects comprise poor points, poor lines, stains, particles, or other defects. At present, defect detection of a display panel is performed mainly using an AOI (Auto Optical Inspection) device. This method requires an operator on the production line to visually observe and recognize the defect based on his or her professional experience. This manual inspection method requires significant labor costs, and the efficiency of manually detecting the defect is low. Moreover, some uncontrollable factors such as misjudgment and oversight may cause situations where risky defects or repairable defects cannot be detected timely, which may affect production efficiency and result in high production costs. Therefore, it is necessary to find an efficient, reliable, and accurate intelligent detection method to replace the manual detection process.

In the related art, a defect in an image of a display panel is recognized by using a trained CNN (Convolutional Neural Network) model.

SUMMARY

According to a first aspect of the present disclosure, an image recognition method for a display panel is provided, the image recognition method comprising: obtaining an image of the display panel, wherein the image of the display panel comprises a plurality of gate lines and a plurality of data lines, the plurality of gate lines extending in a first direction, the plurality of data lines extending in a second direction different from the first direction, and the plurality of gate lines and the plurality of data lines intersecting to define a plurality of sub-pixel regions, and the image of the display panel further comprises a defect pattern, the defect pattern being in one or more of the plurality of sub-pixel regions; and recognizing the defect pattern in the image of the display panel by using an image recognition model to obtain defect information, the defect information comprising at least one of a defect type or a defect position of the defect pattern, wherein the image recognition model comprises a first attention model, the first attention model being configured to learn a weight proportion of a feature of the defect pattern in the image of the display panel.

In some embodiments, the recognizing of the defect pattern in the image of the display panel by using the image recognition model to obtain the defect information comprises: performing dimensionality reduction processing on the image of the display panel to obtain a pixel encoding of the image of the display panel, the pixel encoding representing a pixel feature of the image of the display panel; determining a position encoding of the image of the display panel, the position encoding representing a positional relationship feature between different pixels in the image of the display panel; determining a feature encoding of the image of the display panel based on the pixel encoding and the position encoding, the feature encoding integrating the pixel feature of the image of the display panel and the positional relationship feature between the different pixels; processing the feature encoding by using the first attention model to obtain an output of the first attention model, the first attention model being configured to learn the weight proportion of the feature of the defect pattern in the image of the display panel based on the pixel feature of the image of the display panel and the positional relationship feature between the different pixels; and determining the defect information based on the output of the first attention model.

In some embodiments, the performing of the dimensionality reduction processing on the image of the display panel to obtain the pixel encoding of the image of the display panel comprises: partitioning the image of the display panel to obtain a plurality of sub-images; and performing linear embedding on each of the plurality of sub-images to obtain a sequence comprising a pixel sub-encoding of the each of the plurality of sub-images, the sequence being used as the pixel encoding of the image of the display panel.

In some embodiments, the partitioning of the image of the display panel to obtain a plurality of sub-images comprises: partitioning the image of the display panel based on the plurality of sub-pixel regions to obtain the plurality of sub-images.

In some embodiments, the performing of the dimensionality reduction processing on the image of the display panel to obtain the pixel encoding of the image of the display panel comprises: performing feature extraction on the image of the display panel by using a neural network model to obtain a multi-channel feature map of the image of the display panel; and performing dimensionality reduction processing on each channel of the multi-channel feature map to obtain a sequence comprising a plurality of pixel sub-encodings, the sequence being used as the pixel encoding of the image of the display panel.

In some embodiments, the image recognition model comprises an encoding layer, the encoding layer comprising the first attention model, and the image recognition model further comprises a decoding layer; and the recognizing of the defect pattern in the image of the display panel by using the image recognition model to obtain the defect information comprises: determining, based on an output of the first attention model, an output of the encoding layer as an input to the decoding layer; initializing randomly a plurality of candidate boxes; processing the output of the encoding layer and the plurality of candidate boxes by using the decoding layer to obtain an output of the decoding layer; and determining the defect information based on the output of the decoding layer.

In some embodiments, the decoding layer comprises a second attention model and a third attention model; and the processing of the output of the encoding layer and the plurality of candidate boxes by using the decoding layer to obtain the output of the decoding layer comprises: performing linear transformation on the plurality of candidate boxes by using the second attention model to obtain a first vector matrix and a second vector matrix in the second attention model; determining a third vector matrix in the second attention model based on the first vector matrix and the second vector matrix in the second attention model; determining an output of the second attention model based on the third vector matrix in the second attention model; performing linear transformation on the output of the second attention model by using the third attention model to obtain a first vector matrix in the third attention model; performing linear transformation on the output of the encoding layer to obtain a second vector matrix in the third attention model; determining a third vector matrix in the third attention model based on the first vector matrix and the second vector matrix in the third attention model, the third vector matrix in the third attention model representing the weight proportion of the feature of the defect pattern in the image of the display panel; and determining the output of the decoding layer based on the third vector matrix in the third attention model.

In some embodiments, the output of the decoding layer comprises a plurality of decoding features in a same number as the plurality of candidate boxes, and the image recognition model further comprises a plurality of feedforward neural networks in a same number as the plurality of candidate boxes; and the determining of the defect information based on the output of the decoding layer comprises: inputting the plurality of decoding features into the plurality of feedforward neural networks in one-to-one correspondence to obtain the defect information.

In some embodiments, the determining of the position encoding of the image of the display panel comprises: determining single-dimensional position encodings of the image of the display panel in different dimensional directions; and concatenating the single-dimensional position encodings of the image of the display panel in the different dimensional directions to obtain the position encoding of the image of the display panel.

In some embodiments, the position encoding is a fixed position encoding or a relative position encoding.

In some embodiments, in a case where the position encoding is the fixed position encoding, an element value in the fixed position encoding is a training parameter of the image recognition model.

In some embodiments, the processing of the feature encoding by using the first attention model to obtain the output of the first attention model comprises: obtaining, based on the feature encoding, a correlation matrix of the feature encoding by using the first attention model, the correlation matrix representing the weight proportion of the feature of the defect pattern in the image of the display panel; determining the output of the first attention model based on the correlation matrix.

In some embodiments, the obtaining of, based on the feature encoding, the correlation matrix of the feature encoding by using the first attention model comprises: performing linear transformation on the feature encoding by using the first attention model to obtain a first vector matrix and a second vector matrix; determining a third vector matrix based on the first vector matrix and the second vector matrix, the third vector matrix representing the weight proportion of the feature of the defect pattern in the image of the display panel; and determining the correlation matrix based on the third vector matrix.

In some embodiments, the recognizing of the defect pattern in the image of the display panel by using the image recognition model to obtain the defect information further comprises: reducing resolution of the image of the display panel before performing the dimensionality reduction processing on the image of the display panel to enable the resolution of the image of the display panel to be within a preset resolution range.

In some embodiments, the defect information of the image of the display panel is represented as an encoding sequence, for any position in the encoding sequence, an encoding value of a first value indicating that a defect type corresponding to the any position belongs to a defect type for which the defect pattern is recognized, and an encoding value of a second value indicating that a defect type corresponding to the any position does not belong to the defect type for which the defect pattern is recognized.

In some embodiments, the image of the display panel comprises a plurality of defect patterns, the plurality of defect patterns being recognized as belonging to different defect types, and the encoding sequence comprises a plurality of first values.

In some embodiments, the image of the display panel comprises one or more defect patterns, the one or more defect patterns being recognized as belonging to a same defect type, and the encoding sequence comprises one first value.

In some embodiments, the image recognition model comprises an encoding layer, the encoding layer comprising the first attention model, and the image recognition model further comprise a fully connected layer; the determining of the defect information based on the output of the first attention model comprises: determining an output of the encoding layer based on an output of the first attention model; and determining, based on the output of the encoding layer, the defect information by using the fully connected layer.

In some embodiments, the output of the encoding layer comprises an output of the encoding layer for each of the plurality of sub-images; and the determining of, based on the output of the encoding layer, the defect information by using the fully connected layer comprises: calculating an average value of outputs of the encoding layer for the plurality of sub-images; and processing the average value of the outputs of the encoding layer for the plurality of sub-images by using the fully connected layer to obtain the defect information.

In some embodiments, the determining of the feature encoding of the image of the display panel based on the pixel encoding and the position encoding comprises: initializing randomly a classification reference encoding, the classification reference encoding being independent of the image of the display panel; concatenating the classification reference encoding and the pixel encoding to obtain a composite encoding; determining the feature encoding of the image of the display panel based on the composite encoding and the position encoding; wherein: the output of the encoding layer comprises an output of the encoding layer for the classification reference encoding and each of the plurality of sub-images, and the determining of, based on the output of the encoding layer, the defect information by using the fully connected layer comprises: processing the output of the encoding layer for the classification reference encoding by using the fully connected layer to obtain the defect information.

In some embodiments, the encoding layer comprises a plurality of encoders connected in series, each of the plurality of encoders comprising one first attention model, and an input of a first encoder being the feature encoding.

In some embodiments, the encoding layer further comprises a plurality of linear layers, at least one encoder of the plurality of encoders being followed in series by at least one linear layer of the plurality of linear layers, the at least one linear layer being configured to perform compression on a scale of an output of the at least one encoder corresponding to the at least one linear layer, and an input of another encoder other than the first encoder being an output of an encoder or an linear layer directly preceding the another encoder in series; the determining of the output of the encoding layer based on the output of the first attention model comprises: performing, for the at least one linear layer connected in series after the at least one encoder, compression on a scale of an output of a last one of the at least one encoder to obtain an output of the at least one linear layer as an input of an encoder directly connected in series after the at least one linear layer; determining, for each encoder of the plurality of encoders, an output of the each encoder based on an output of the first attention model in the each encoder; and determining an output of an encoder directly connected in series before a linear layer of the plurality of linear layers and an output of the last one of the plurality of encoders as the output of the encoding layer; and the determining of, based on the output of the encoding layer, the defect information by using the fully connected layer comprises: performing feature fusion on the output of the encoder directly connected in series before the linear layer of the plurality of linear layers and the output of the last one of the plurality of encoders by using a feature pyramid algorithm; and determining, based on an result of the feature fusion, the defect information by using the fully connected layer.

According to a second aspect of the present disclosure, a training method for an image recognition model of a display panel is provided, the training method comprising: obtaining an image of the display panel and annotation data of the image, wherein the image of the display panel comprises a plurality of gate lines and a plurality of data lines, the plurality of gate lines extending in a first direction, the plurality of data lines extending in a second direction different from the first direction, and the plurality of gate lines and the plurality of data lines intersecting to define a plurality of sub-pixel regions, the image of the display panel further comprises a defect pattern, the defect pattern being in one or more of the plurality of sub-pixel regions, and the annotation data comprises at least one of an actual defect type or an actual defect position of the defect pattern; recognizing the defect pattern in the image of the display panel by using the image recognition model to obtain defect information, the defect information comprising at least one of a defect type or a defect position of the defect pattern, wherein the image recognition model comprises a first attention model, the first attention model being configured to learn a weight proportion of a feature of the defect pattern in the image of the display panel; and training the image recognition model based on the defect information and the annotation data to obtain a trained image recognition model.

According to a third aspect of the present disclosure, an electronic device is provided, the electronic device comprising: a memory; and a processor coupled to the memory, the processor being configured to, based on instructions stored in the memory, perform the image recognition method or the training method according to any one of the previous embodiments.

According to a fourth aspect of the present disclosure, an image recognition system for a display panel is provided, the image recognition system comprising: a server configured to: obtain an image of the display panel, wherein the image of the display panel comprises a plurality of gate lines and a plurality of data lines, the plurality of gate lines extending in a first direction, the plurality of data lines extending in a second direction different from the first direction, and the plurality of gate lines and the plurality of data lines intersecting to define a plurality of sub-pixel regions, and the image of the display panel further comprises a defect pattern, the defect pattern being in one or more of the plurality of sub-pixel regions; and recognize the defect pattern in the image of the display panel by using an image recognition model to obtain defect information, the defect information comprising at least one of a defect type or a defect position of the defect pattern, wherein the image recognition model comprises a first attention model, the first attention model being configured to learn a weight proportion of a feature of the defect pattern in the image of the display panel.

In some embodiments, the image recognition system further comprises: an image acquisition device configured to obtain the image of the display panel in a process of manufacturing the display panel; and an image database configured to store the image of display panel obtained by the image acquisition device; wherein the server is further configured to obtain the image of the display panel from the image database.

In some embodiments, the image recognition system further comprises: a client device configured to, in response to a control operation of a user, obtain the defect information from the server and visually display the defect information.

According to a fifth aspect of the present disclosure, there is provided a non-volatile computer-readable storage medium having computer program instructions stored thereon, wherein the computer program instructions, when executed by a processor, implement the image recognition method or the training method according to any one of the previous embodiments.

BRIEF DESCRIPTION OF THE DRAWINGS

The accompanying drawings, which constitute part of this specification, illustrate embodiments of the present disclosure and, together with this specification, serve to explain the principles of the present disclosure.

The present disclosure may be more clearly understood from the following detailed description with reference to the accompanying drawings, in which:

FIG. 2*b* is a schematic diagram showing an image of an OLED display panel according to some embodiments of the present disclosure;

FIG. 3 is a flowchart showing a recognition of a defect pattern in an image of a display panel according to some embodiments of the present disclosure;

FIG. 8 is a flowchart showing a process of processing an output of an encoding layer and a plurality of candidate boxes by using a decoding layer to obtain the output of the decoding layer according to some embodiments of the present disclosure;

DETAILED DESCRIPTION

Figure 1:
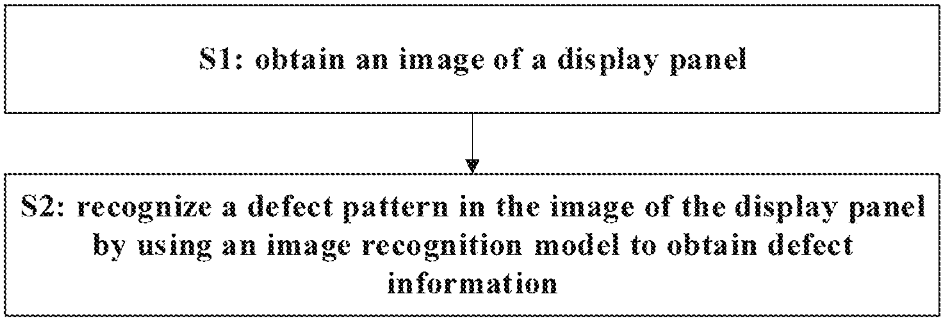
FIG. 1 is a flowchart showing an image recognition method according to some embodiments of the present disclosure.

Various exemplary embodiments of the present disclosure will now be described in detail with reference to the accompanying drawings. It should be noted that, unless otherwise specified, the relative arrangement, numerical expressions and numerical values of the components and steps set forth in these examples do not limit the scope of the present disclosure.

At the same time, it should be understood that, for ease of description, the dimensions of the various parts shown in the drawings are not drawn to actual proportions.

The following description of at least one exemplary embodiment is in fact merely illustrative and is in no way intended as a limitation to the present disclosure, its application or use.

Techniques, methods, and apparatus known to those of ordinary skill in the relevant art may not be discussed in detail, but where appropriate, these techniques, methods, and apparatuses should be considered as part of the specification.

Of all the examples shown and discussed herein, any specific value should be construed as merely illustrative and not as a limitation. Thus, other examples of exemplary embodiments may have different values.

It should be noted that similar reference numerals and letters indicate similar items in the accompanying drawings below, and therefore, once an item is defined in a drawing, there is no need for further discussion in the subsequent accompanying drawings.

In the related art, an actual receptive field of the CNN model is usually smaller than a theoretical receptive field of the CNN model, which makes it difficult for the actual receptive field of the CNN model to cover a whole image of a display panel, so that global context information of the image of the display panel cannot be sufficiently used to capture a feature of a defect pattern, and thus the defect in the image of the display panel cannot be accurately recognized.

In view of the above technical issue, the present disclosure proposes an image recognition method for a display panel, which can improve the accuracy of recognizing a defect in the image of the display panel.

FIG. 1 is a flowchart showing an image recognition method according to some embodiments of the present disclosure.

As shown in FIG. 1, the image recognition method comprises steps S1 to S2. For example, the image recognition method is performed by an image recognition device.

In step S1, an image of a display panel is obtained. The image of the display panel comprises a plurality of gate lines and a plurality of data lines. The gate lines extend in a first direction. The data lines extend in a second direction different from the first direction. The plurality of gate lines and the plurality of data lines intersects to define a plurality of sub-pixel regions. The image of the display panel further comprises a defect pattern. The defect pattern is in one or more sub-pixel regions. In some embodiments, dimensions of the image of the display panel is $H \times W \times C$. H represents a height of the image of the display panel. W represents a width of the image of the display panel. C represents a number of channels of the image of the display panel. For example, a value of C is 3.

Figure 2A:
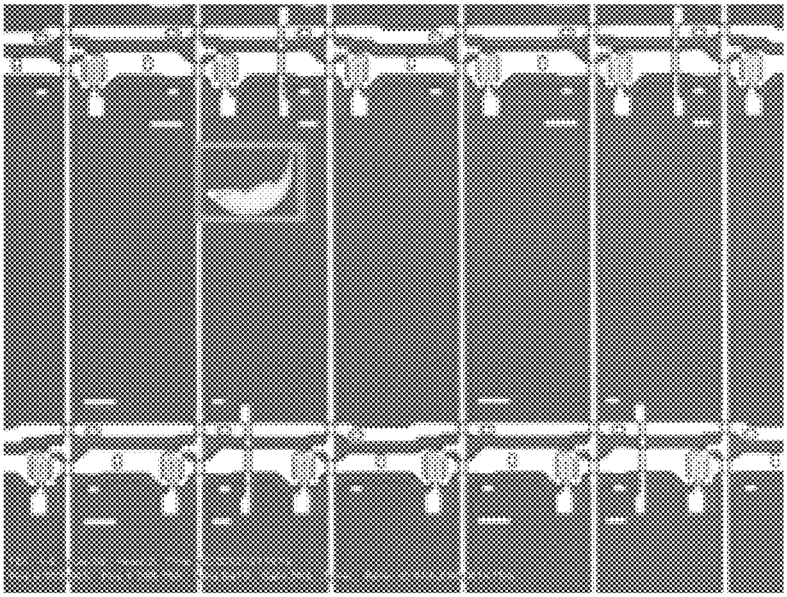
FIG. 2*a* is a schematic diagram showing an image of an LCD display panel according to some embodiments of the present disclosure.

FIG. 2*a* is a schematic diagram showing an image of an LCD display panel according to some embodiments of the present disclosure.

As shown in FIG. 2*a*, in the LCD (Liquid Crystal Display) display panel, lines extending along a horizontal direction are gate lines, and lines extending along a vertical direction are data lines. The gate lines and the data lines intersects to define a plurality of sub-pixel regions. As shown in a rectangular box in FIG. 2*a*, there is a defect pattern in a sub-pixel region.

FIG. 2*b* is a schematic diagram showing an image of an OLED display panel according to some embodiments of the present disclosure.

As shown in FIG. 2*b*, in the OLED (Organic Light-Emitting Diode) display panel, lines extending along a horizontal direction are gate lines, and lines extending along a vertical direction are data lines. The gate lines and the data lines intersects to define a plurality of sub-pixel regions. As shown in a rectangular box in FIG. 2*b*, there is a defect pattern in a sub-pixel region.

Returning to FIG. 1, in step S2, the defect pattern in the image of the display panel is recognized by using an image recognition model to obtain defect information. The defect information comprises at least one of a defect type or a defect position of the defect pattern. The image recognition model comprises a first attention model. The first attention model is configured to learn a weight proportion of a feature of the defect pattern in the image of the display panel. For example, the first attention model learns a weight proportion of a feature of the defect pattern relative to its own feature and to a feature of another part of the image of the display panel except for the defect pattern.

In some embodiments, the first attention model is further configured to learn a weight proportion of a feature of another part in the image of the display panel. For example, the first attention model learns a weight proportion of a feature of another part relative to its own feature and to an feature of the defect pattern.

In the above embodiment, through introducing an attention model into the image recognition model, the image recognition model can learn a weight proportion of a feature of the defect pattern in the image of the display panel, so that the global context information of the image of the display panel can be sufficiently utilized to capture the feature of the defect pattern. Thus, the feature of the defect pattern can be learned more accurately, and thus the defect in the image of the display panel can be recognized more accurately, so that the accuracy of recognizing the defect in the image of the display panel can be improved.

In some embodiments, the above step S2 can be implemented in a method shown in FIG. 3.

FIG. 3 is a flowchart showing a recognition of a defect pattern in an image of a display panel according to some embodiments of the present disclosure.

As shown in FIG. 3, the process of recognizing the defect pattern in the image of the display panel comprises steps S21 to S25.

In step S21, dimensionality reduction processing is performed on the image of the display panel to obtain a pixel encoding of the image of the display panel. The pixel encoding represents a pixel feature of the image of the display panel. In some embodiments, the pixel encoding is a one-dimensional vector. The dimensionality reduction processing on the image of the display panel is actually a dimensionality reduction processing on an optical parameter (i.e. grayscale value information in a high dimension) of the image of the display panel. Due to the large dimensionality of image information, dimensionality reduction performed on the image of the display panel can greatly improve the efficiency of the image recognition model in defect recognition and improve the training efficiency of the image recognition model.

In some embodiments, the above step S21 can be implemented in the following manner.

First of all, the image of the display panel is partitioned to obtain a plurality of sub-images.

In some embodiments, the image of the display panel is partitioned based on the sub-pixel regions to obtain the plurality of sub-images. For example, each sub-pixel region is divided into one sub-image. As another example, in a case where a defect pattern is distributed over multiple sub-pixel regions, the multiple sub-pixel regions are divided into one sub-image.

In other embodiments, the image of the display panel can also be partitioned based on a preset sub-image size, a preset sub-image shape, and a preset division direction to obtain the plurality of sub-images. For example, the sub-image size, the sub-image shape, and the division direction can also be set based on the size and distribution of the sub-pixel regions.

Figure 4:
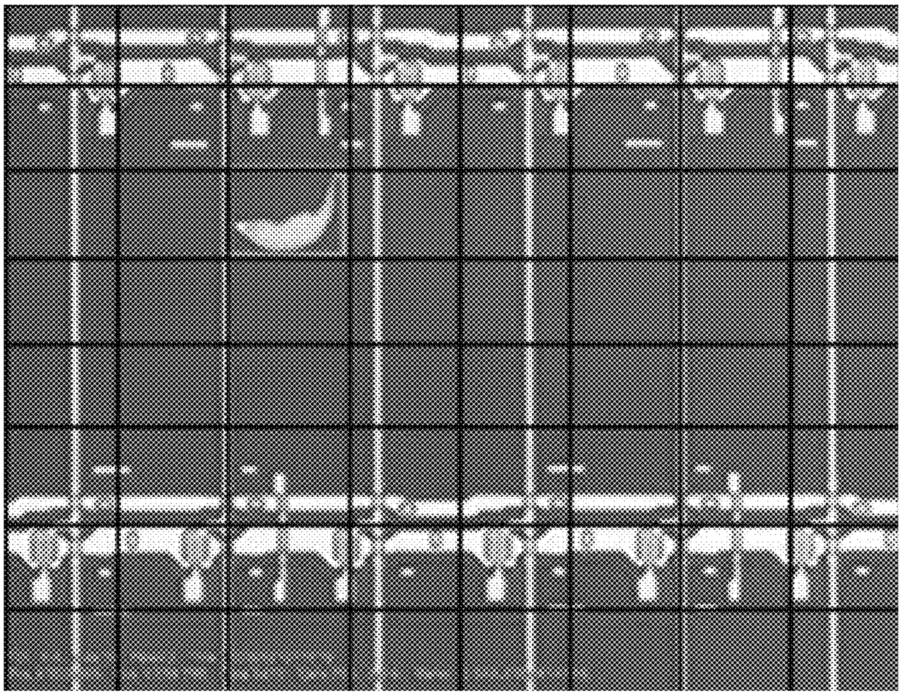
FIG. 4 shows a schematic diagram of the image of the display panel shown in FIG. 2*a* after matrix partitioning.

In some further embodiments, the image of the display panel can also be divided into small rectangular blocks or patches of the same size as the plurality of sub-images through matrix partitioning. For example, the size of the image of the display panel is H×W×C, and the preset size of the small rectangular block can be P×P. The number of sub-images is N=(H×W)/(P×P). The size of each sub-image is P×P×C. FIG. 4 shows a schematic diagram of the image of the display panel shown in FIG. 2*a* after matrix partitioning. As shown in FIG. 4, a plurality of sub-images arranged in a matrix are obtained after matrix partitioning of the image of the display panel.

In the above embodiment, through partitioning the image of the display panel taking into account the distribution of the sub-pixel regions in the image of the display panel, the accuracy of recognizing the defect in the image of the display panel can be further improved while improving the efficiency of the image recognition model in defect recognition.

In some embodiments, the plurality of sub-images can be expanded in one dimension to obtain a sub-image sequence. For example, the sub-image sequence is represented as $[X_1, X_2, \ldots, X_N]$. $X_i$ represents the i-th sub-image, where a value of i is an integer greater than or equal to 1 and less than or equal to N, where N is the total number of sub-images.

Then, linear embedding is performed on each of the plurality of sub-images to obtain a sequence comprising a pixel sub-encoding of the each of the plurality of sub-images, the sequence being used as the pixel encoding of the image of the display panel. For example, linear embedding is performed on the various sub-images in the sub-image sequence, respectively.

In some embodiments, linear embedding is performed on each sub-image by using a fully connected layer. Linear embedding is also known as linear transformation.

Figure 5:
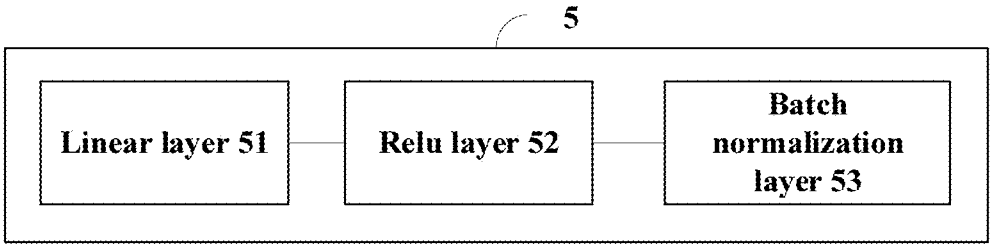
FIG. 5 is a schematic diagram showing a structure of a fully connected layer according to some embodiments of the present disclosure.

FIG. 5 is a schematic diagram showing a structure of a fully connected layer according to some embodiments of the present disclosure.

As shown in FIG. 5, the fully connected layer 5 comprises a linear layer 51, a Relu (Rectified Linear Unit) layer 52, and a batch normalization (Batch Norm) layer 53.

For example, the fully connected layer 5 shown in FIG. 5 can be represented as $E_d$, wherein d represents a dimension of the pixel encoding obtained by after linear embedding of each sub-image by the fully connected layer. After the processing of the fully connected layer 5 as shown in FIG. 5, the pixel encoding of the image of the display panel can be obtained with the dimensions [N, d], that is, comprising N pixel sub-encodings of dimension d. The pixel sub-encoding corresponding to the i-th sub-image $X_i$ is $X_i \times E_d$.

For example, a size of an image of a display panel in a batch is batchsize×3×1024×1024 (3 is the number of RGB channels, 1024×1024 is the size of each image of the display panel. If the size of each sub-image obtained by partitioning the image of the display panel in this batch is 32×32, 1024 sub-images are obtained through partitioning.

In some embodiments, the input dimension of the image recognition model can be determined based on the size (P×P) of the sub-image of the display panel, such that a ratio between the size (P×P) of the sub-image of the display panel and the input dimension of the image recognition model is within a preset ratio range. For example, the preset ratio range is 10-15. In some embodiments, in a case where the determined input dimension of the image recognition model still does not meet the preset dimension requirement, the input dimension of the image recognition model can be determined by scaling the size of the image or changing the size of the patch.

In some embodiments, the input dimension of the image recognition model is 128 or 256. Assuming the input dimension of the image recognition model is 128, the process of changing the size of the image of the display panel in this batch is as follows.

The size of the image of the display panel in a batch is batchsize×3×1024×1024. The image of the display panel in the batch is partitioned into patches, and the size after partitioning is batchsize×3×32×32×32×32. By a fully connected layer, linear embedding is performed on each sub-image partitioned, and the size of the pixel encoding obtained is batchsize×1024×128. At this point, the dimensionality reduction process of the images of the display panels in the batch is completed. For example, a value the batchsize is an integer power of 2, such as 8, 16, or 32, which can be determined depending on the graphic memory.

In other embodiments, the above step S21 can also be implemented as follows.

First, feature extraction is performed on the image of the display panel by using a neural network model to obtain a multi-channel feature map of the image of the display panel. In some embodiments, the neural network model is a CNN (Convolutional Neural Networks) model, and particularly is a faster-RCNN model. For example, different CNN models can be selected based on the complexity of the image of the display panel. In a case where the size of the image of the display panel is less than 224×224, VGG (Visual Geometry Group) 16 or VGG19 can be used. In a case where the size of the image of the display panel is larger, resnet (Residual Network) 50 or resnet101 can be used.

In some embodiments, the neural network model is composed of basic components of a convolutional neural network. For example, a convolutional layer of a convolutional neural network is used to extract features from the image of a display panel, and a pooling layer of the convolutional neural network is used to downsample the extracted features, aided by operations such as a residual structure and a layer-hopping connection, so that the neural network model can extract abundant high-dimensional and low-dimensional features of the image of the display panel.

In the above embodiment, the neural network model is used to extract high-dimensional image features. According to deep learning theory, the more abundant the features extracted from the image of the display panel, the better the recognition effect of the image recognition model, and the larger the size of the image input to the image recognition model, the better the recognition effect. However, in industrial application scenarios, it is also necessary to consider the recognition speed of the image recognition model. Therefore, for different application scenarios and image complexity, it is necessary to select different structures for the neural network model to achieve a balance between recognition accuracy and recognition speed. For example, an image with a size of a short edge of about 800 pixels can be selected as the input of the image recognition model, which can avoid missing small bad patterns while maintaining a certain recognition speed for the image recognition model.

For most scenarios, resnet (Residual Network) or densenet (Dense Convolutional Network) can be used as the neural network model. For some scenarios that require extremely high recognition speed, a network such as the model with depthwise separable convolution (mobileNet) or the model with convolutional network compression (shuffleNet) can be selected as the neural network model while reducing the size of the input image, to improve processing speed.

In some embodiments, the neural network model can perform batch feature extraction on images of multiple display panels. The quantity that can be processed in each batch is represented by batchsize. For example, taking images of multiple display panels of size batchsize×C×H×W as an example, the size of the feature map obtained after processing by the neural network model is batchsize×C×h×w, where h=H/32, w=W/32.

Then, dimensionality reduction processing is performed on each channel of the multi-channel feature map to obtain a sequence comprising a plurality of pixel sub-encodings, the sequence being used as the pixel encoding of the image of the display panel. In some embodiments, one-dimensional expansion of each channel of the feature map is performed to obtain C pixel sub-encodings of dimension h×w. These C pixel sub-encodings of dimension h×w form a pixel encoding having a size of [C, h×w], which is used as the pixel encoding of the image of the display panel. In some embodiments, a convolutional kernel can be used to reduce the dimension of C into C' to obtain a pixel encoding of [C', h×w]. For example, a size of the convolutional kernel is 1×1.

In the above embodiment, through extracting the feature of the image of the display panel using a neural network model, the accuracy of the pixel encoding of the image of the display panel can be further improved, thereby further improving the accuracy of recognizing the defect in the image of the display panel.

In some embodiments, before the dimensionality reduction processing on the image of the display panel is performed, resolution of the image of the display panel is reduced to enable the resolution of the image of the display panel to be within a preset resolution range. In general, the resolution of the image of the display panel is relatively high. By appropriately reducing the resolution of the image of the display panel, the recognition efficiency of the image recognition model can be improved. For example, a size of a short edge of the image of the display panel after resolution reduction is between 800 pixels and 1200 pixels.

Returning to FIG. 3, in step S22, a position encoding of the image of the display panel is determined. The position encoding represents a positional relationship feature between different pixels in the image of the display panel.

In some embodiments, the position encoding is a fixed position encoding or a relative position encoding.

In a case where the position encoding is a fixed position encoding, an element value in the fixed position encoding is a training parameter of the image recognition model. For example, taking the number N of sub-images of the image of the display panel as 512 and the dimension of the pixel encoding as d, a matrix of 512×128 is first initialized. Then, in the process of training the image recognition model, the matrix is trained to obtain the position encoding of the image of the display panel.

In a case where the position encoding is a relative position encoding, the position encoding of the image of the display panel can be a trigonometric function position encoding, that is a sinusoidal position encoding. For example, for each sub-image, there is one position sub-encoding corresponding to the each sub-image. The position sub-encoding of each sub-image is represented as $E_{posi}$, where a value of i is an integer greater than or equal to 1 and less than or equal to N. The position sub-encodings of the plurality of sub-images can form a position encoding matrix (also known as position embedding matrix) of size N×d, which is used as the position encoding of the image of the display panel.

In some embodiments, firstly, single-dimensional position encodings of the image of the display panel in different dimensional directions is determined. Then, the single-dimensional position encodings of the image of the display panel in the different dimensional directions are concatenated to obtain the position encoding of the image of the display panel. The different dimension directions comprise an x-direction and a y-direction of the image of the display panel.

In the above embodiment, through concatenating the single-dimensional position encodings in different dimensions, the position encoding of the image of the display panel can characterize the positional relationship between the pixels of the image in two directions, that is the x-direction and the y-direction, thereby more accurately characterizing two-dimensional features of the image of the display panel. In this way, the accuracy of the image recognition model in learning the feature of the image of the display panel can be improved, thereby improving the accuracy of recognizing the defect in the image of the display panel.

In step S23, a feature encoding of the image of the display panel is determined based on the pixel encoding and the position encoding. The feature encoding integrates the pixel feature of the image of the display panel and the positional relationship feature between the different pixels.

In some embodiments, the feature encoding of the image of the display panel is obtained by adding the pixel encoding to the position encoding. Taking a sub-image denoted as $X_i$, a fully connected layer denoted as $E_d$, and a position sub-coding of each sub-image denoted as $E_{posi}$ as an example, the feature encoding can be represented as $Z=\text{concat}(X_1 \times E_d + E_{pos1}, X_2 \times E_d + E_{pos2}, \ldots, X_N \times E_d + E_{posN})$, where concat( ) represents a concatenating operation. $X_i \times E_d + E_{posi}$ represents the feature sub-encoding corresponding to the i-th sub-image or the i-th channel of the feature map in the feature encoding.

In some embodiments, in a case of dimensionality reduction by partitioning the image of the display panel into the plurality of sub-images, a classification reference encoding can be randomly initialized. The classification reference encoding is independent of the image of the display panel. The classification reference encoding and the pixel encoding are concatenated to obtain a composite encoding. The feature encoding of the image of the display panel can be determined based on the composite encoding and the position encoding. For example, the composite encoding is added to the position encoding to determine the feature encoding. In the case, the feature encoding of the image of the display panel comprises a feature sub-encoding corresponding to each pixel sub-encoding and a feature sub-encoding corresponding to the classification reference encoding.

In step S24, the feature encoding is processed by using the first attention model to obtain an output of the first attention model. The first attention model is configured to learn the weight proportion of the feature of the defect pattern in the image of the display panel based on the pixel feature of the image of the display panel and the positional relationship feature between the different pixels.

In some embodiments, the above step S24 can be implemented as follows.

First, based on the feature encoding, a correlation matrix of the feature encoding is obtained by using the first attention model. The correlation matrix represents the weight proportion of the feature of the defect pattern in the image of the display panel.

For example, the correlation matrix of the feature encoding is obtained through the following steps i) to iii).

In step i), linear transformation is performed on the feature encoding by using the first attention model to obtain a first vector matrix and a second vector matrix. For example, both the first vector matrix and the second vector matrix represent the pixel feature of the image of the display panel. In some embodiments, the first vector matrix is a query vector (q) matrix, and the second vector matrix is a key vector (k) matrix. For example, linear transformation is performed on the feature encoding by using the first attention model to further obtain a value vector matrix (v).

In some embodiments, the first vector matrix and the second vector matrix are obtained based on different linear transformations of a same feature sub-encoding of the feature encoding. In this case, the image recognition model adopts a self-attention mechanism.

In other embodiments, the first vector matrix and the second vector matrix are obtained based on linear transformations of different feature sub-encodings of the feature encoding. In this case, the image recognition model adopts an attention mechanism. It should be understood by those skilled in the art that the self-attention mechanism is a variant of the attention mechanism.

In step ii), a third vector matrix is determined based on the first vector matrix and the second vector matrix. In some embodiments, the third vector matrix can be determined based on a product of the first vector matrix and a transposition of the second vector matrix. Taking the first vector matrix as a query vector matrix and the second vector matrix as a key vector matrix as an example, the third vector matrix is determined based on a product of the query vector matrix and a transposition of the key vector matrix. The third vector matrix represents the weight proportion of the feature of the defect pattern in the image of the display panel.

In step iii), the correlation matrix is determined based on the third vector matrix. For example, the correlation matrix is the third vector matrix.

Then, the output of the first attention model is determined based on the correlation matrix.

For example, this can be achieved by the following steps 1)-2) to determine the output of the first attention model based on the correlation matrix.

In step 1), scale transformation, masking operation and normalization operation are successively performed on the correlation matrix to obtain a first attention score matrix. The first attention score matrix is configured to describe an attention weight score of each feature sub-encoding in feature encoding. The attention weight score of each feature sub-encoding reflects an attention weight score of each sub-image in the image of the display panel. In some embodiments, the masking operation is an alignment operation.

In step 2), the output of the first attention model is determined based on the first attention score matrix. For example, if a fourth vector matrix is obtained by performing linear transformation on the feature encoding of the image of the display panel, the output of the first attention model can be determined based on a product of the first attention score matrix and the fourth vector matrix. For example, the fourth vector matrix is a value vector matrix.

In step S25, the defect information is determined based on the output of the first attention model.

The process of determining the defect information based on the output of the first attention model according to some embodiments of the present disclosure will be described in detail below with reference to FIGS. 6*a*, 6*b*, and 6*c*.

Figure 6A:
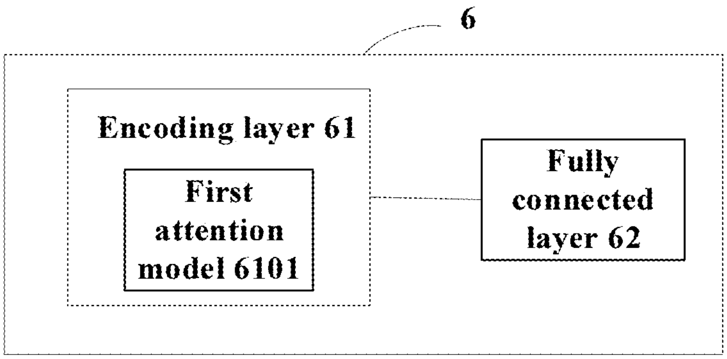
FIG. 6*a* is a block diagram showing an image recognition model according to some embodiments of the present disclosure.

FIG. 6*a* is a block diagram showing an image recognition model according to some embodiments of the present disclosure.

Figure 6B:
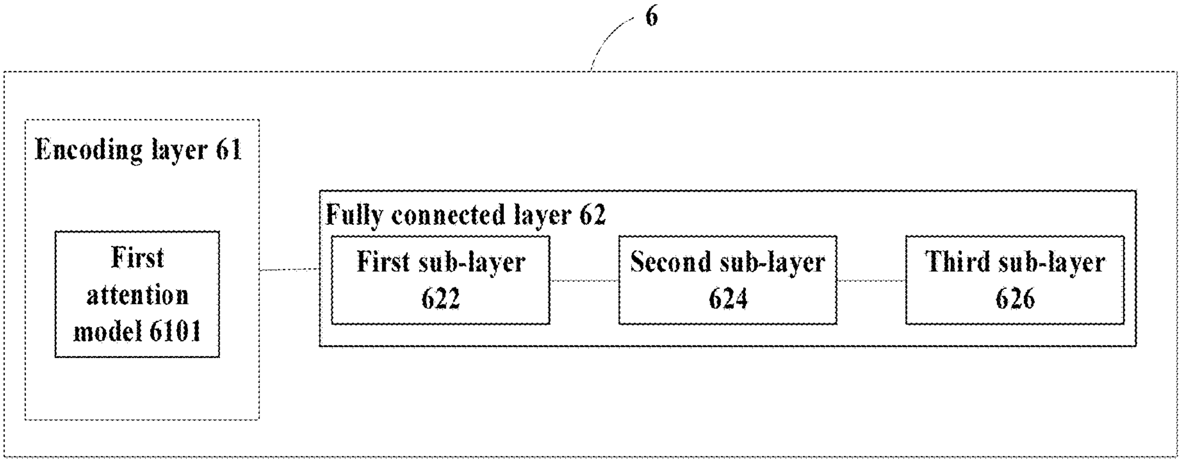
FIG. 6*b* is a block diagram showing an image recognition model according to other embodiments of the present disclosure.

FIG. 6*b* is a block diagram showing an image recognition model according to other embodiments of the present disclosure.

Figure 6C:
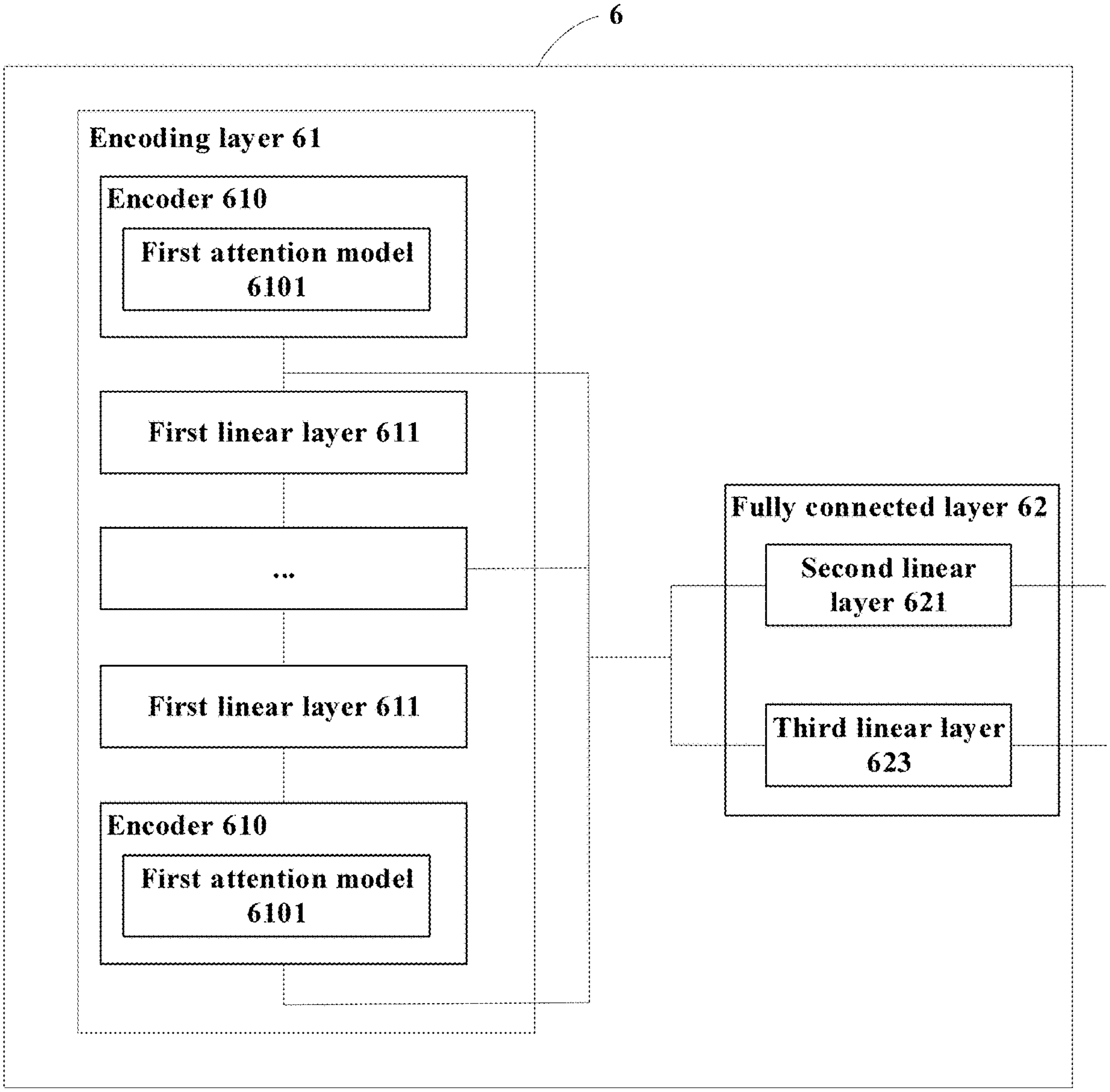
FIG. 6*c* is a block diagram showing an image recognition model according to still other embodiments of the present disclosure.

FIG. 6*c* is a block diagram showing an image recognition model according to still other embodiments of the present disclosure.

As shown in FIG. 6*a*, the image recognition model 6 comprises an encoding layer 61 and a fully connected layer 62. The encoding layer 61 comprises a first attention model 6101.

For example, referring to FIG. 6*a*, the determining of the defect information based on the output of the first attention model can be implemented in the following way.

First, an output of the encoding layer 61 is determined based on the output of the first attention model 6101. For example, the input of the first attention model 6101 is the feature encoding of the image of the display panel. The feature encoding comprises the feature sub-encoding corresponding to each sub-image.

Then, based on the output of the encoding layer 61, defect information is determined by using the fully connected layer 62.

In some embodiments, in the case of dimensionality reduction by partitioning the image of the display panel into the plurality of sub-images, for example, if the feature encoding determined based on the pixel encoding and the position encoding is used as the input of the encoding layer 61, the output of the encoding layer 61 comprises an output of the encoding layer for each sub-image. This can be achieved by determining the defect information, based on the output of encoding layer 61, by using the fully connected layer 62 in the following way.

First, an average value of outputs of the encoding layer for the plurality of sub-images is calculated. Then, the average value of the outputs of the encoding layer for the plurality of sub-images is processed by using the fully connected layer 62 to obtain the defect information.

In the above embodiment, the first attention model learns a weight proportion of a feature of each sub-image relative to its own feature and to the features of the other sub-images. In these weight proportions, the feature of each sub-image have the highest weight proportion relative to the own feature of the sub-image. Therefore, no matter the output of the encoding layer for which sub-image is selected as the reference for classification, it is not very objective. The average value of the outputs of the encoding layer for the plurality of sub-images can more objectively represent the correlation relationship feature between different pixels in the image of the display panel. Therefore, the determining of the defect information based on the average value of outputs of the encoding layer for the plurality of sub-images can further improve the accuracy of recognizing the defect in the image of the display panel.

In other embodiments, in the case of dimensionality reduction by partitioning the image of the display panel into the plurality of sub-images, for example, if the feature encoding determined based on the composite encoding and the position encoding is used as the input of the encoding layer 61, the output of the encoding layer 61 comprises an output of the encoding layer for the classification reference encoding and each of the plurality of sub-images. In this case, the output of the encoding layer for the classification reference encoding is processed by using the fully connected layer 62 to obtain the defect information.

In the above embodiment, the first attention model learns a weight proportion of a feature of each sub-image relative to the own feature of the sub-image and to the features of the other sub-images. In these weight proportions, the feature of each sub-image have the highest weight proportion relative to the own feature of the sub-image. Therefore, no matter the output of the encoding layer for which sub-image is selected as the reference for classification, it is not very objective. The classification reference encoding is independent of the feature of the image of the display panel, and the output of the encoding layer for the classification reference encoding can more objectively represent the correlation relationship feature between different pixels in the image of the display panel. Therefore, the determining of the defect information based on the output of the encoding layer for the classification reference encoding can further improve the accuracy of recognizing the defect in the image of the display panel.

In some embodiments, referring to FIG. 6*b*, in the case of dimensionality reduction by partitioning the image of the display panel into the plurality of sub-images, the fully connected layer 62 may comprise a first sub-layer 622, a second sub-layer 624, and a third sub-layer 626 connected in series. For example, structures of the first sub-layer 622 and the second sub-layer 624 are the same as the structure shown in FIG. 5. The third sub-layer 626 comprises a linear layer and a loss layer. The loss layer is a softmax loss layer. In this case, the fully connected layer 62 is a MLP (Multilayer Perceptron). In this case, single-task processing of the image recognition model can be implemented to identify the defect type of the defect pattern in the image of the display panel.

With reference to the difference between FIG. 6*c* and FIG. 6*a*, the process of determining the defect information based on the output of the first attention model according to some embodiments of the present disclosure will be described in detail below.

In some embodiments, referring to FIG. 6*c*, the encoding layer 61 comprises a plurality of encoders 610 connected in series. Each encoder comprises one first attention model 6101. An input of the first attention model 6101 is the feature encoding of the image of the display panel. For example, a structure of the encoder 610 is the same as a structure of an encoder in a transformer model.

In some embodiments, the encoding layer further comprises a plurality of linear layers. At least one encoder is followed in series by at least one linear layer. The at least one linear layer is configured to perform compression on a scale of an output of the at least one encoder corresponding to the at least one linear layer. An input of another encoder other than the first encoder is an output of an encoder or an linear layer directly preceding the another encoder in series. For example, except for a last one of the plurality of encoders, at least one encoder is followed in series by at least one linear layer.

For the at least one linear layer connected in series after the at least one encoder, compression is performed on a scale of an output of a last one of the at least one encoder to obtain an output of the at least one linear layer as an input of an encoder directly connected in series after the at least one linear layer.

For each encoder of the plurality of encoders, an output of the each encoder is determined based on an output of the first attention model in the each encoder.

An output of an encoder directly connected in series before a linear layer and an output of the last one of the plurality of encoders is determined as the output of the encoding layer.

In this case, feature fusion is performed on the output of the encoder directly connected in series before the linear layer and the output of the last one of the plurality of encoders by using a feature pyramid algorithm. Based on an result of the feature fusion, the defect information of the image of the display panel is determined by using the fully connected layer.

In the above embodiment, by using at least one linear layer connected in series after at least one encoder to perform size compression on the output of the at least one encoder, the dimension of the output of the at least one encoder can be reduced, thereby enabling the plurality of encoders of the encoding layer to learn features of different dimensions.

In some embodiments, one or more linear layers can be connected in series after one encoder, or one or more linear layers can be connected in series after multiple encoders connected in series. In the case of multiple linear layers connected in series after at least one encoder, scale compression is performed on the output of the at least one encoder using the multiple linear layers. The feature fusion is performed on the outputs of the encoding layer, which have different dimensions, by using the feature pyramid algorithm so that the image recognition model can learn multi-scale image features of the image of the display panel, thereby further improving the accuracy of recognizing the defect in the image of the display panel.

A structure with a plurality of linear layers interposed between a plurality of encoders according to some embodiments of the present disclosure will be described in detail with reference with FIG. 6*c*. It should be understood that FIG. 6*c* is only an example, and the present disclosure is not limited to the implementation of FIG. 6*c*.

In some embodiments, referring to FIG. 6*c*, the encoding layer 61 further comprises a plurality of first linear layers 611. Except for the last one of the plurality of encoders 610 connected in series, each encoders 610 is followed by one first linear layer 611 in series. Each first linear layer 611 is configured to perform compression on a scale of the output of the encoder 610 connected in series before the each linear layer. The inputs of each of the encoders other than the first encoder is an output of the first linear layer connected in series before the each of the encoders.

Referring to FIG. 6*c*, for the first encoder 610, based on the output of the first attention model 6101 in the first encoder 610, the output of the first encoder 610 is determined as the output of the encoding layer 61. For another encoder 610, the scale of the output of a previous encoder of the another encoder 610 is compressed using the first linear layer 611 connected in series before the another encoder to obtain the output of the first linear layer 611 as the input of the another encoder 610. Based on the output of the first attention model 6101 in the another encoder 610, the output of the another s encoder is determined as an output of the encoding layer 61. In some embodiments, compression processing can be performed by fusing the sub-pixel regions.

In this case, by using the feature pyramid algorithm, feature fusion is performed on the outputs of the various encoders 610. Based on the result of feature fusion, defect information can be determined using the fully connected layer 62.

Taking the encoding layer 61 comprising three encoders 610 as an example, a size of an output of the first encoder is (bsz, n, d), an output of the second encoder is (bsz, n/4, d), and an output of the third encoder is (bsz, n/16, d). Bsz is the number an image of a display panel in the current batch, n is a size of the image of the display panel, and d is a dimension of the image of the display panel after dimensionality reduction. After the processing of the fully connected layer 62, defect information of the image of the display panel can be obtained.

In some embodiments, referring to FIG. 6*c*, the fully connected layer 62 comprises a second linear layer 621 and a third linear layer 623. The second linear layer 621 is configured to determine a defect type of the defect pattern in the defect information of the image of the display panel based on the result of feature fusion. The third linear layer 623 is configured to determine a defect position of the defect pattern in the defect information of the image of the display panel based on the result of feature fusion.

Taking the fully connected layer 62 comprising a second linear layer 621 and a third linear layer 623 as an example, an output of the second linear layer 621 is the defect type of the defect pattern, denoted as (bsz, (n+n/4+n/16)× d, m). M represents the total number of defect types that the image recognition model can recognize. An output of the third linear layer 623 is the defect position of the defect pattern, denoted as (bsz, (n+n/4+n/16)× d, 4). The last element 4 in the defect position representation indicates that the defect position of the defect pattern is composed of four values, that is the x coordinate and y coordinate of the upper left corner and the x coordinate and y coordinate of the lower right corner of the detection box.

In the above embodiment, by concatenating a linear layer after each encoder to compress the output size of the encoder and using a feature pyramid algorithm to perform feature fusion on the outputs of the various encoders, the image recognition model can learn the multi-scale image features of the image of the display panel, thereby further improving the accuracy of recognizing the defect in the image of the display panel.

The process of recognizing a defect pattern in an image of a display panel according to other embodiments of the present disclosure will be described below with reference to FIG. 7.

Figure 7:
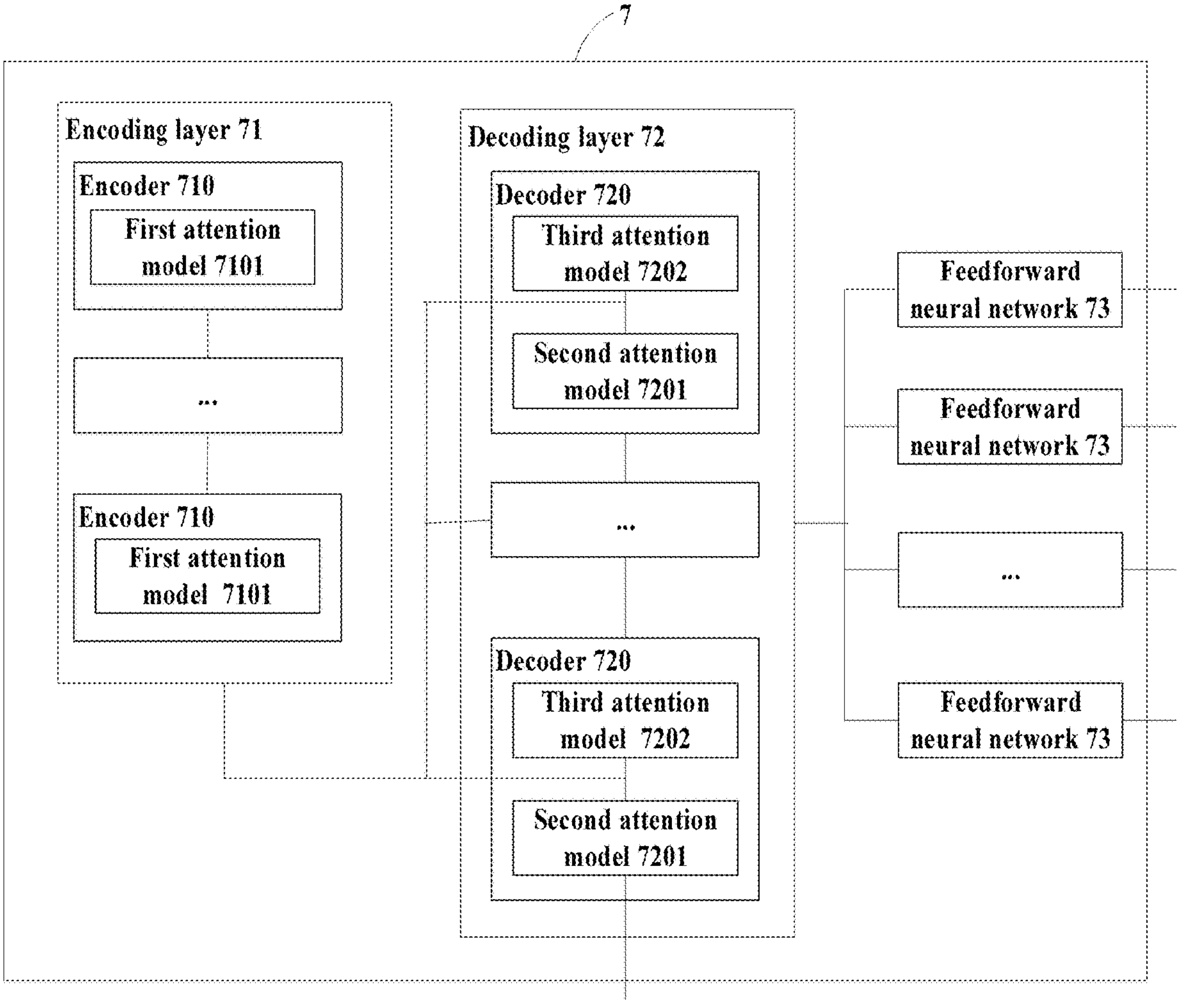
FIG. 7 is a block diagram showing an image recognition model according to other embodiments of the present disclosure.

FIG. 7 is a block diagram showing an image recognition model according to other embodiments of the present disclosure.

As shown in FIG. 7, the image recognition model 7 comprises an encoding layer 71 and a decoding layer 72. The encoding layer 71 comprises a first attention model 7101.

For example, step S2 shown in FIG. 1 can be implemented by carrying out the following steps a) to d).

In step a), based on an output of the first attention model, an output of the encoding layer is determined as an input to the decoding layer.

In step b), a plurality of candidate boxes are randomly initialized. The plurality of candidate boxes are randomly initialized vectors and are used as an input of the decoding layer.

In step c), the output of the encoding layer and the plurality of candidate boxes is processed by using the decoding layer to obtain an output of the decoding layer.

In step d), the defect information is determined based on the output of the decoding layer.

In the above embodiment, multiple classification tasks and multiple regression tasks can be achieved by the cooperation of the encoding layer and the decoding layer in combination with the plurality of candidate boxes inputted by the decoding layer. That is, the image recognition model can recognize multiple defect types of multiple defect patterns in the image of the display panel, as well as their corresponding defect positions.

In some embodiments, as shown in FIG. 7, the decoding layer 72 comprises a second attention model 7201 and a third attention model 7202.

For example, referring to FIG. 7, the above step c) can be implemented by the method shown in FIG. 8.

FIG. 8 is a flowchart showing a process of processing an output of an encoding layer and a plurality of candidate boxes by using a decoding layer to obtain the output of the decoding layer according to some embodiments of the present disclosure.

As shown in FIG. 8, the process of processing the output of the encoding layer and a plurality of candidate boxes using a decoding layer to obtain the output of the decoding layer comprises steps S81 to S87.

In step S81, linear transformation is performed on the plurality of candidate boxes by using the second attention model 7201 to obtain a first vector matrix and a second vector matrix in the second attention model 7201. For example, the first vector matrix is a query vector matrix, and the second vector matrix is a key vector matrix. For example, both the first vector matrix and the second vector matrix represent a pixel feature of the image of the display panel.

In step S82, a third vector matrix in the second attention model 7201 is determined based on the first vector matrix and the second vector matrix in the second attention model 7201.

In step S83, an output of the second attention model 7201 is determined based on the third vector matrix in the second attention model 7201.

In step S84, linear transformation is performed on the output of the second attention model 7201 by using the third attention model 7202 to obtain a first vector matrix in the third attention model 7202. For example, the first vector matrix is a query vector matrix. For example, the first vector matrix represents the pixel feature of the image of the display panel.

In step S85, linear transformation is performed on the output of the encoding layer 71 to obtain a second vector matrix in the third attention model 7202. For example, the second vector matrix is a key vector matrix. For example, the second vector matrix represents the pixel feature of the image of the display panel.

In step S86, a third vector matrix in the third attention model 7202 is determined based on the first vector matrix and the second vector matrix in the third attention model 7202. The third vector matrix in the third attention model represents the weight proportion of the feature of the defect pattern in the image of the display panel In step S87, the output of decoding layer 72 is determined based on the third vector matrix in the third attention model 7202.

In some embodiments, the output of the decoding layer 72 comprises a plurality of decoding features in a same number as the plurality of candidate boxes. For example, the number of the plurality of candidate boxes is related to the number of defects in the image of the displayed panel, which can be one, two or ten. As shown in FIG. 7, the image recognition model 7 further comprises a plurality of feedforward neural networks (ENNs) 73 in a same number as the plurality of candidate boxes. For example, the plurality of decoding features are input into the plurality of feedforward neural networks 73 in one-to-one correspondence to obtain the defect information of the image of the display panel.

In some embodiments, each feedforward neural network 73 comprises a first MLP and a second MLP. The first MLP is configured to determine the defect type in the defect information, i.e., to perform classification operation. The second MLP is configured to determine the defect position in the defect information, i.e., to perform regression operation.

In some embodiments, referring to FIG. 7, the encoding layer 71 comprises a plurality of encoders 710 connected in series. Each encoder comprises one first attention model 7101. An input of a first encoder is a feature encoding of the image of the display panel. For example, a structure of the encoder 710 may be a structure of an encoder in a transformer model.

In some embodiments, referring to FIG. 7, the decoding layer 72 comprises a plurality of decoders 720 connected in series. Each decoder comprises one second attention model 7201 and one third attention model 7202. An input of a first decoder comprises a plurality of candidate boxes and the output of the encoding layer 71. For example, a structure of the decoder 720 may be a structure of a decoder in a transformer model.

It should be understood by those skilled in the art that FIGS. 6*a*-6*c*, and 7 are only some embodiments provided in the present disclosure, but do not mean that the present disclosure can only be implemented in these ways. Those skilled in the art can combine different structures according to the content of the present disclosure.

In some embodiments, the defect information of the image of the display panel is represented as an encoding sequence. For any position in the encoding sequence, an encoding value of a first value indicates that a defect type corresponding to the any position belongs to a defect type for which the defect pattern is recognized, and an encoding value of a second value indicates that a defect type corresponding to the any position does not belong to the defect type for which the defect pattern is recognized. For example, the first value is 1, and the second value is 0.

For example, the image of the display panel comprises a plurality of defect patterns. The plurality of defect patterns are recognized as belonging to different defect types. The encoding sequence comprises a plurality of first values. An image recognition task where the encoding sequence comprises a plurality of first values can be called a multi-label task. Table 1 shows defect types of image 1 to image 4 of the display panel resulted in a multi-label task.

TABLE 1

| | Defect type 1 | Defect Type 2 | Defect Type 3 | Defect Type 4 | Defect Type 5 | Defect Type 6 | Defect Type 7 |
|---|---|---|---|---|---|---|---|
| Image 1 | 0 | 0 | 1 | 0 | 1 | 0 | 0 |
| Image 2 | 1 | 0 | 0 | 0 | 0 | 1 | 1 |
| Image 3 | 0 | 1 | 0 | 0 | 1 | 0 | 0 |
| Image 4 | 1 | 0 | 0 | 1 | 0 | 0 | 0 |

As shown in Table 1, Image 1 comprises two defect types: a defect type 3 and a defect type 5. Image 2 comprises two defect types: a defect type 1 and a defect type 6. Image 3 comprises two defect types: a defect type 2 and the defect type 5. Image 4 comprises two defect types: the defect type 1 and a defect type 4.

In some embodiments, defect information comprising multiple defect types can be adjusted based on an actual production need. For example, in a case where the defect information comprises a specified defect type, the encoding values of all defect types other than the specified defect type can be adjusted to the second value.

For another example, the image of the display panel comprises one or more defect patterns. The one or more defect patterns are recognized as belonging to a same defect type. The encoding sequence comprises one first value. An image recognition task where the encoding sequence comprises one first value can be called a single-label task. Table 2 shows defect types of image 1 to image 4 of the display panel in a single-label task.

TABLE 2

| | Defect Type 1 | Defect Type 2 | Defect Type 3 | Defect Type 4 | Defect Type 5 | Defect Type 6 | Defect Type 7 |
|---|---|---|---|---|---|---|---|
| Image 1 | 0 | 0 | 1 | 0 | 0 | 0 | 0 |
| Image 2 | 1 | 0 | 0 | 0 | 0 | 0 | 0 |
| Image 3 | 0 | 0 | 0 | 0 | 1 | 0 | 0 |
| Image 4 | 0 | 0 | 0 | 1 | 0 | 0 | 0 |

As shown in Table 2, Image 1 comprises a defect types 3, Image 2 comprises a defect types 1, Image 3 comprises a defect types 5, and Image 4 comprises a defect types 4.

In some embodiments, the defect position of the defect pattern in the display panel is represented by a detection box.

Figure 9:
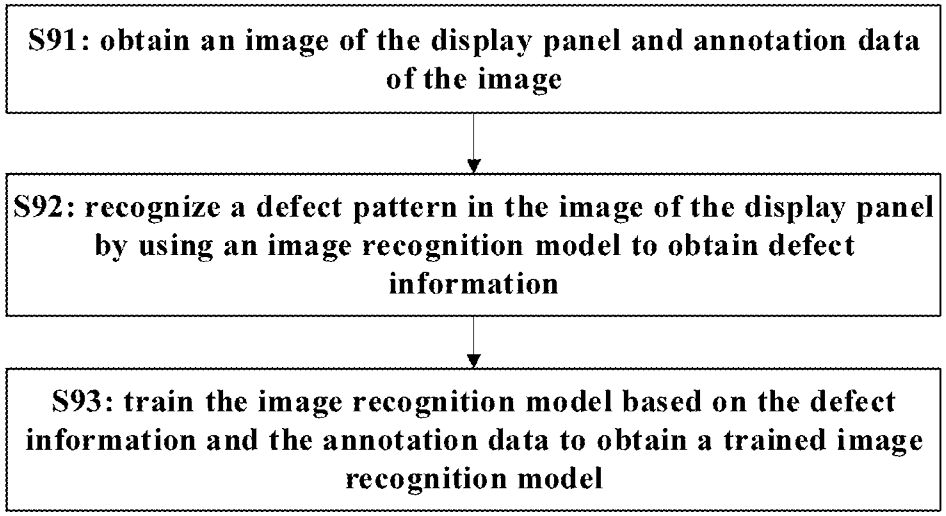
FIG. 9 is a flowchart showing a training method according to some embodiments of the present disclosure.

FIG. 9 is a flowchart showing a training method according to some embodiments of the present disclosure.

As shown in FIG. 9, a training method for an image recognition model of a display panel comprises steps S91 to S93.

In step S91, an image of the display panel and annotation data of the image are obtained. The image of the display panel comprises a plurality of gate lines and a plurality of data lines. The plurality of gate lines extends in a first direction. The plurality of data lines extends in a second direction different from the first direction. The plurality of gate lines and the plurality of data lines intersects to define a plurality of sub-pixel regions. The image of the display panel further comprises a defect pattern. The defect pattern is in one or more sub-pixel regions. The annotation data comprises at least one of an actual defect type or an actual defect position of the defect pattern.

In some embodiments, the defect position is represented by a defect border. The annotation data comprises an upper left and lower right coordinates of the defect border, as well as a defect type. The defect type comprises but is not limited to a point defect, a line defect, a stain, various particles, etc.

In step S92, the defect pattern in the image of the display panel is recognized by using the image recognition model to obtain defect information. The defect information comprises at least one of a defect type or a defect position of the defect pattern. The image recognition model comprises a first attention model. The first attention model is configured to learn a weight proportion of a feature of the defect pattern in the image of the display panel.

In step S93, the image recognition model is trained based on the defect information and the annotation data to obtain a trained image recognition model.

In some embodiments, a loss value of a loss function is calculated based on the defect information and the annotation data. The image recognition model is trained by using the loss value calculated.

For example, for a single-label task, a loss function corresponding to the defect type is a cross entropy loss function. A formula of the cross entropy loss function is $$-\log\frac{e^{s_t}}{\sum_{i=1}^{n}e^{s_i}}=-\log\frac{1}{\sum_{i=1}^{n}e^{s_i-s_t}}=\log\sum_{i=1}^{n}e^{s_t-s_i}=\log\left(1+\sum_{i=1,i\neq t}^{n}e^{s_i-s_t}\right).$$

$s_t$ is a calculation result for a correct classification, and $s_i$ is a calculation result for all classifications.

For another example, for a multi-label task, a loss function corresponding to the defect type is a multi-class cross entropy loss function. A formula of the multi-class cross entropy loss function is $\log(1+\Sigma_{i\in\Omega_{neg},j\in\Omega_{pos}}e^{s_i-s_j})=\log(1+\Sigma_{i\in\Omega_{neg}}e^{s_i}\Sigma_{i\in\Omega_{pos}}e^{-s_{j}\prime})$. $s_i$ is a calculation result for a positive label, and $s_j$ is a calculation result for a negative label, $\Omega_{neg}$ is a negative label set of the defect pattern, and $\Omega_{pos}$ is a positive label set of the defect pattern.

In some embodiments, a loss function corresponding to the defect position is a L1 loss function.

In the above embodiments, an encoding sequence is used to represent the defect type in the defect information of the image of the display panel, which can be more flexibly applied to different application scenarios such as single-class and multi-class tasks. Through representing the defect type in the defect information of the image of the display panel using the encoding sequence, it is also possible to sort the defect conditions of images of different display panels based on the encoding sequence to determine the severity of the defects in the images of different display panels.

In some embodiments, defect information can also be obtained based on a pre-screening strategy and the defect type and the defect position of the image of the display panel obtained using the image recognition model. For example, based on the importance of the defects a to the business and occurrence frequencies of the defects, pre-screening strategy is used to judge and select a final defect type and a final defect position as the defect information of the image recognition model. In some embodiments, the pre-screening strategy comprises selecting one specific defect type as the output type (i.e. only focusing on that type) if multiple defect types are identified, or sorting the defect types based on the importance of the defect types. The pre-screening strategy described above can also be customized according to the need of the user, i.e. it can be customized to cope with diverse image types and scenes, which is not specifically limited in the embodiment.

Figure 10:
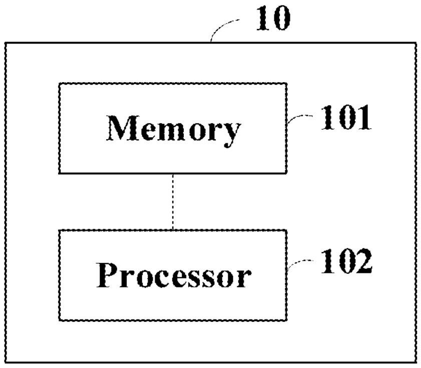
FIG. 10 is a block diagram showing an electronic device according to some embodiments of the present disclosure.

FIG. 10 is a block diagram showing an electronic device according to some embodiments of the present disclosure.

As shown in FIG. 10, a electronic device 10 comprises a memory 101; and a processor 102 coupled to the memory 101. The memory 101 is configured to store instructions of corresponding embodiments for executing the image recognition method or the training method. The processor 120 is configured to, based on the instructions stored in the memory 101, perform the image recognition method or the training method according to any one of the embodiments of the present disclosure.

Figure 11:
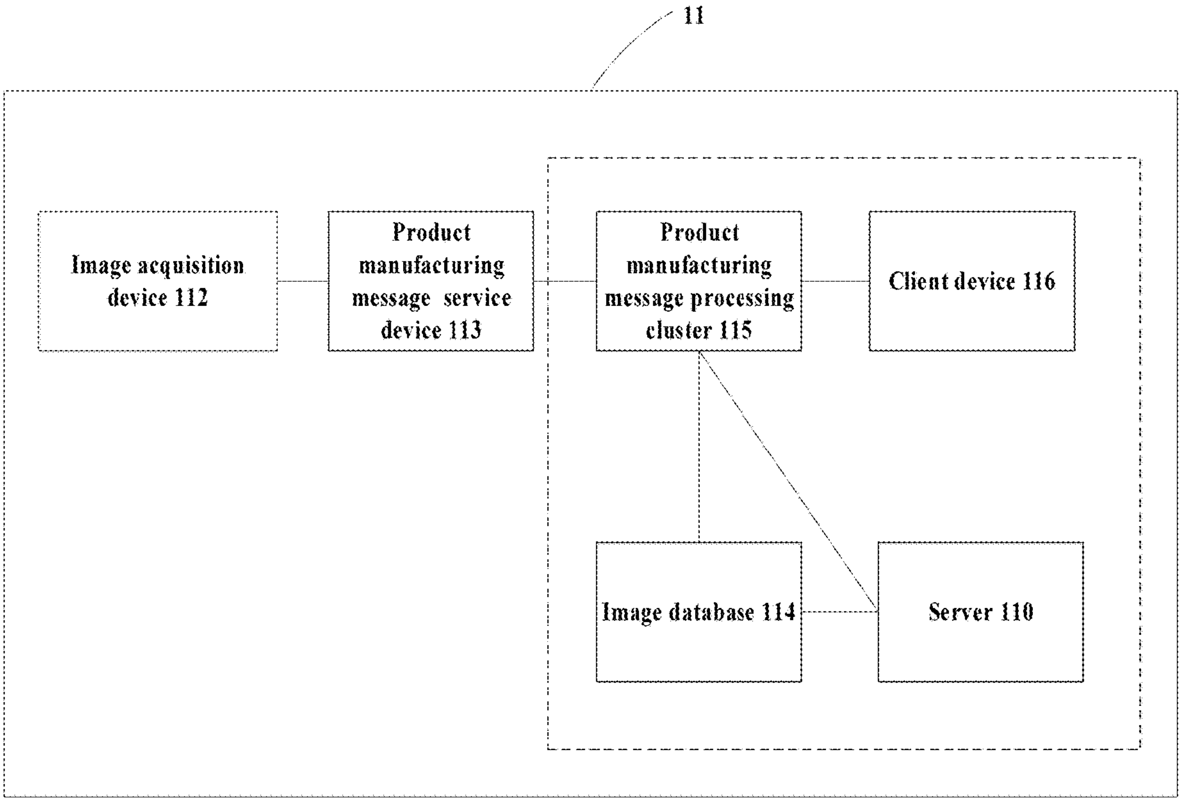
FIG. 11 is a block diagram showing an image recognition system according to some embodiments of the present disclosure.

FIG. 11 is a block diagram showing an image recognition system according to some embodiments of the present disclosure.

As shown in FIG. 11, an image recognition system 11 for a display panel comprises a server 110.

The server 110 is configured to perform the image recognition method according to any number of embodiments of the present disclosure. For example, the server 110 is a product defect recognition cluster. The product mentioned here is a display panel.

In some embodiments, the image recognition system 11 further comprises an image acquisition device 112 and an image database 114.

The image acquisition device 112 is configured to obtain an image of a display panel in a process of manufacturing the display panel.

In some embodiments, the image acquisition device 112 may be a camera, video camera, or the like. For example, in the defect detection process for a display panel in the semiconductor industry, the image acquisition device 112 can be an AOI (Automated Optical Inspection) device. The AOI device can perform an optical inspection on a display panel during the manufacturing process of the display panel, determine a difference between the image of the display panel and a standard image of a display panel, identify the difference as a defect and take the photo, thereby obtaining the image of the display panel with a defect pattern, facilitating the later recognition and analysis of the defect type and the defect position. The image acquisition device 112 can also be another video camera or another camera with image acquisition function.

The image database 114 is configured to store the image of display panel obtained by the image acquisition device. The image database 114 may be a distributed file system (DFS) or other data storage device such as a relational database (Oracle, Redis and MySQL).

In some embodiments, the image database 114 is configured to directly receive and store the image of the display panel from the image acquisition device.

In other embodiments, when the image of the display panel is captured by the image acquisition device 112, the image may first be stored in a factory database. The image database 114 is configured to obtain the image of the display panel from the factory database. Through transferring the image of the display panel from the factory database to the image database 114, it can be ensured that subsequence operations in the server 110 such as calling or storing the image of the display panel in the image database 114 will not affect other data in the factory database.

In some embodiments, the server 110 is further configured to obtain the image of the display panel from the image database 114.

In some embodiments, the image recognition system 11 further comprises a client device 116. The client device 116 is configured to, in response to a control operation of a user, obtain the defect information of the image of the display panel from the server and visually display the defect information.

In some embodiments, the image recognition system 11 further comprises a product manufacturing message service device 113 and a product manufacturing message processing cluster 115.

The product manufacturing message service device 113 is configured to monitor and manage all or some of the product manufacturing messages generated during the production and manufacturing process. In an intelligent production process, a large number of product manufacturing messages can be generated, the product manufacturing messages comprising production record information generated during the product manufacturing process. By means of the product manufacturing messages, it is possible to know the product manufacturing equipment through which the product has passed and the processing result of the equipment. For example, the product manufacturing message service device 113 comprises a manufacturing execution system (MES), or can also comprise an executive information system (EIS). The product manufacturing message service device 113 can also be another device configured to monitor product manufacturing, which is not limited in the present disclosure. The product manufacturing message service device 113 can capture all or some of product manufacturing messages in a product manufacturing process and broadcast or send these product manufacturing messages to the product manufacturing message processing cluster 115.

In some embodiments, the image acquisition device 112 is further configured to send the image of the display panel obtained in the process of manufacturing the display panel to the image database 114 successively through the product manufacturing message service device 113 and the product manufacturing message processing cluster 115.

In some embodiments, the client device 116 is configured to receive the defect information of the image of the display panel recognized by the server 110 through the product manufacturing message processing cluster 115.

In some embodiments, the server 110, the image database 114, the product manufacturing message processing cluster 115, and the client device 116 construct together a distributed product defect analysis system (as shown by the dashed box in FIG. 11). It can be understood that various devices in a distributed product defect analysis system can be different types of hardware devices, such as personal digital assistants (PDAs), audio/video devices, mobile phones, MP3 players, personal computers, laptops, servers, etc. For example, the product manufacturing message service device 113 and the image acquisition device 112 can also be comprised in the distributed product defect analysis system.

The distributed product defect analysis system can generate a product defect analysis task for detecting and analyzing a defect in the image of the display panel, comprising a task of recognizing the defect in the image of the display panel using an image recognition model, a task of identifying the defect in the image of the display panel by an inspector, or a task of training the image recognition model. After completing the analysis of the defect in the image of the display panel, the distributed product defect analysis system can return an analysis result to the product manufacturing message processing device 113 and also to the image acquisition device 112.

The product manufacturing message processing cluster 115 and the product defect recognition cluster (i.e. server 110) can comprise two or more independent computers connected through a network. These computers form a group and are managed as a single system. When interacting with an external system, the cluster can act as an independent server.

The product manufacturing message service device 113, the product manufacturing message processing cluster 115, and the server 110 can be computing devices that comprise processors and storage devices. These devices can be connected through a network. The above devices can communicate with each other directly or indirectly, such as through sending and receiving data and/or signals through the network.

The distributed product defect analysis system is a system that consists of a group of computers interconnected through a network to transmit messages and communications and then coordinate their behavior. The components interact with each other to achieve a common goal. The network can be an Internet of Things (IoT) based on the Internet and/or a telecommunications network, which can be a wired network or a wireless network. For example, it can be an electronic network capable of performing information exchange functions, such as a local area network (LAN), a metropolitan area network (MAN), a wide area network (WAN), a cellular data communication network, etc. A distributed computing system may have software components, such as software objects or other types of individually addressable isolated entities, such as distributed objects, proxies, actors, virtual components, etc. Generally, each such component is individually addressable and has a unique identity (such as an integer, a GUID, a string or an opaque data structure, etc.) in a distributed system. In a distributed system that allows geographical distribution, an application can be resident in a cluster by deployment. There are various systems, components and network configurations that support a distributed computing environment. For example, the computing systems can be connected together through a wired or wireless system, through a local network or a widely distributed network. At present, many networks are coupled to the Internet, which provides an infrastructure for widely distributed computing and comprises many different networks, although any network infrastructure can be used for communications that may easily occur to the system, for example, as described in various examples.

The distributed product defect analysis system provides the sharing of computer resources and services through the communication exchange between computing devices and systems. These resources and services comprise information exchange for an object (such as a file), a high speed cache storage apparatus and a disk storage apparatus. These resources and services also comprise the sharing of processing capabilities across a plurality of processing units for load balancing, resource expansion, specialization of processing, etc. For example, the distributed data distribution system can comprise a host with a client device/a server, a network topology of peer-to-peer or hybrid architectures and a network infrastructure.

In some embodiments, the image acquisition device 112, the product manufacturing message service device 113, and the distributed product defect analysis system constitute a site through which multiple products pass in sequence throughout the product manufacturing process. The site represents a system composed of one or more devices through which the products in the production line may pass to complete a product processing step.

For example, in a photolithography process of an array substrate in the semiconductor industry, a side corresponding to the photolithography process can be a system consisting of a cleaning device, a pre-baking device, a cooling device, a gluing device, an exposure device, a developing device, a post-baking device, a cooling device, etc. The site can also be a single device (exposure device) corresponding to the exposure process. When a product enters the site, the site will capture an entry message (trackin message). When the product leaves the site, the site will capture a leave site message (trackout message). In order to ensure the quality of the product, product information/product data in both the trackin message and the trackout message must meet the requirements of product manufacturing.

The site can also be a virtual site in the product manufacturing process, representing a non-physical processing step in product detection and analysis. For example, product defect analysis is a process step, the site serves as a system for product defect analysis, and the site can conduct defect analysis on passing products, obtain and analyze all process information used for product defect detection, and then determine product defects. If a product has defects that do not meet the manufacturing requirements of the product, the site issues an alarm and prevents the product from entering the next site, or instructs the product to enter a site corresponding to a repair process.

The image acquisition device 112, the product manufacturing message service device 113, and the product defect analysis system may be computing devices comprising processors and memory. These devices can be connected through a network. The above devices can communicate with each other directly or indirectly, such as through sending and receiving data and/or signals through the network. The network can be an Internet of Things (IoT) based on the Internet and/or a telecommunications network, which can be a wired network or a wireless network. For example, it can be an electronic network capable of performing information exchange functions, such as a local area network (LAN), a metropolitan area network (MAN), a wide area network (WAN), a cellular data communication network, etc.

In the disclosure, the site is mainly applied for the detection, analysis, and processing of the product defect. It should be understood by those skilled in the art that the site can also be applied to other processes in the manufacturing production of products.

Figure 12:
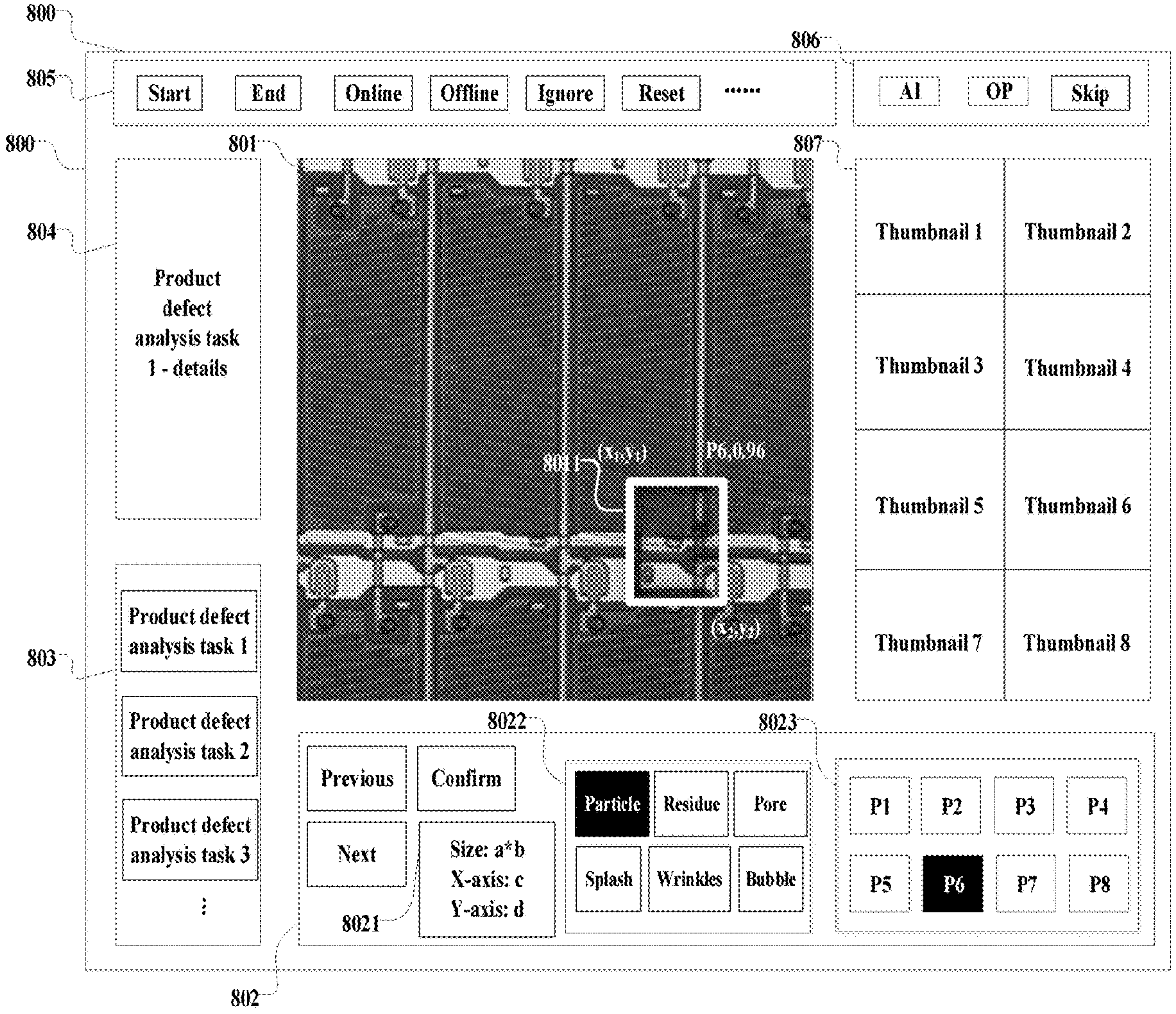
FIG. 12 is a schematic diagram showing a graphical user interface of a client device according to some embodiments of the present disclosure.

FIG. 12 is a schematic diagram showing a graphical user interface of a client device according to some embodiments of the present disclosure.

As shown in FIG. 12, the client device 116 in FIG. 11 comprises a display. The display can display a graphical user interface (GUI) 800, which is used for human-machine interaction. The graphical user interface 800 may comprise a window, an icon, a scrollbar, and any other graphical user interface object that a user can use to input a command to the device. It should be understood that exemplary embodiments of the present disclosure may comprise various GUIs of various shapes, designs, and structures.

The exemplary human-machine interaction comprises adjusting the position and/or size of one or more user interface objects, activating a button, or opening a file/application represented by a graphical user interface object, as well as associating metadata with one or more user interface objects, or manipulating the graphical user interface in other ways. The exemplary graphical user interface comprises a digital image, a video, a text, an icon, a control such as a button, and another graphic. In some cases, a user will need to perform the manipulation on a graphical user interface object in a related application.

Optionally, the client device 116 can generate one or more of a product image area 801, a shortcut function area 802, a task list area 803, a task detail area 804, an operation function area 805, a task selection area 806, or a thumbnail area 807, and display them on the graphical interface 800 of the display.

Optionally, the display is configured to display a product image recognized by the product defect recognition cluster, the product image comprising product defect content annotation, wherein the product defect content annotation comprises: a defect marking box, defect marking box coordinates, defect classification annotation, and a defect classification score. The product image recognized by the product defect recognition cluster can be displayed in the product image area 801. The product image containing the product defect content annotation is a product image obtained by the server 110 in FIG. 11 based on a first defect recognition task. After recognizing the defect content (defect type, position, and size) in the product image, the server 110 automatically annotates the defect content in the product image and displays it on the display.

For example, in the product image, a box/circle is used to encircle a defective part of the product (such as the white box 8011 in FIG. 12), and the vertex coordinates $(x_1, y_1)$ and $(x_2, y_2)$ of the box are marked to show the position and size of the defect. Text annotation is placed near the box to indicate the type of defect (such as P6 above the white box 8011 in FIG. 12) and the defect classification score (such as 0.96 above the white box 8011 in FIG. 12).

The defect type annotation, defect coordinates and size, and product defect score can also be displayed in detail in other components such as a Current Processing Task box in the graphical user interface 800 (not shown in this figure). There is no limitation on this in the present disclosure. The display displays product images recognized by the product defect recognition cluster, allowing a user to visualize the defect recognition effect of the server 110 and conduct a review to ensure the accuracy of the artificial intelligence recognition. A defect classification score is displayed, representing the probability of the defect type obtained by the artificial intelligence recognition. By displaying the defect classification score, the user is more focused when reviewing defect recognition results with lower scores.

The display is also configured to display a product image that cannot be recognized by the product defect recognition cluster, that is, a product image without product defect content annotation. The product image that cannot be recognized by the product defect recognition cluster comprises a product image for which the product defect recognition is performed based on a second defect recognition task, as well as a product image with a defect classification score less than a certain threshold after the recognition of the product defect recognition cluster. In industrial production, in order to ensure the smooth flow of processes, an extremely high accuracy requirement is usually imposed on the defect analysis model. Therefore, if the server 110 cannot recognize some defects contained in the images or if the defects have lower recognition scores (recognition probabilities), all the images are pushed to the client device 116 to ensure the accuracy of defect recognition through manual identification. Therefore, if the product defect recognition cluster is unable to recognize defects in a product image, no annotation is made on the product image and the product image without product defect content annotation is displayed in the product image display area 801.

The client device 116 is configured to obtain a product defect recognition instruction input by the user. Based on the product defect recognition instruction, the product defect content annotation of the product image that the server 110 cannot recognize is displayed.

The client device 116 is configured to generate a shortcut area 802, and the display is configured to display shortcut function buttons located in the shortcut area 802. The shortcut function buttons can comprise basic function buttons such as "Previous", "Next", "Confirm" to switch between product images, also comprise a defect position marking area used to achieve the editing of the defect position marking box by editing the coordinates and size of the defect box, and also comprise buttons for setting product defect types, such as "Particle", "Residue", "Pore", "Splash", "Wrinkles", "Bubble" in the defect class setting area 8022, and "P1", "P2", "P3" and the like in the corresponding defect subclass setting area 8023, to perform annotation on product defect type using these shortcut buttons. Optionally, the shortcut area 802 can also comprise shortcut keys for setting product defect types, so that some defect type setting buttons in the shortcut area 802 can be omitted. The client device 116 can also capture the mouse position in real-time and convert the mouse position into a specific position and size on the product image. A user can use the mouse to draw the position and size of a product defect on the product image. The client device can obtain a product defect recognition instruction input by the user based on the shortcut area 802 or by other means. Based on the product defect identification instruction, manual annotation of product defect content can be achieved, thereby displaying content annotation of a product defect of the product image that cannot be recognized by the product defect recognition cluster.

The client device 116 is further configured to obtain a product defect review instruction input by the user, and based on the product defect review instruction, confirm or modify the content annotation of a product defect in the product image to be reviewed. The content annotation of the product defect in the product image to be reviewed can be obtained by the recognition of the server 110 or by manual recognition. For example, product classification annotation can be efficiently achieved by artificial intelligence-based product defect recognition. However, due to the complexity of the production processes and the improvement of processing technology, the recognition effect of the defect recognition model may fluctuate. Therefore, experienced staff are required to regularly review the recognition results to ensure the accuracy and stability of artificial intelligence recognition. For another example, the content annotations of product defects manually identified by junior staff can be reviewed again by experienced staff to ensure the accuracy of the junior staff's manual annotations. Therefore, the client device 116 provides a user with a functional application related to the review of product defect recognition.

For example, a user can select the type of a product image to be reviewed on the client device 116, the type of the product image to be reviewed comprising a product image recognized by the server 110 based on the defect recognition model and a product image manually recognized. A product image to be reviewed is displayed in the product image area 801.

Assuming that a particle defect P6 in the product image to be reviewed has been mistakenly recognized as a particle defect P2, the user can click/touch the product defect type setting button "P6" in the shortcut area 802 to enable the client device to obtain a product defect review instruction input by the user. Based on the review instruction, the defect type annotation P2 in the product image containing product defect recognition content can be changed to P6, thereby modifying the product defect content in the product image to be reviewed.

Assuming that the product defect content in the product image to be reviewed has been correctly annotated, the client device can obtain a product defect review instruction input by the user by clicking/touching a basic function button "Next" or "Confirm" in the shortcut area 802, and confirm the product defect content in the product image to be reviewed, thereby switching the product image in the product image area 801 to the next product image to be reviewed.

Assuming that the position or size of the defect position marking box recognized by the defect recognition model is incorrect, the defect position can be adjusted by inputting the position or size information of the defect position marking box in the defect position marking area 8021. The user can also select the position and size of a product defect by clicking and dragging with the mouse. The client device 116 can capture a position of the mouse in real-time and convert the position of the mouse into a specific position and size on the product image. The user can also directly draw a new defect position marking box on the product image containing the product defect recognition content in the product image area 801 to replace an old defect position marking box. The client device 116 can also obtain a product defect review instruction through other input methods used by the user (such as keyboard shortcut settings), which is not limited in the present disclosure.

The display can also be configured to display a task list corresponding to multiple product defect analysis tasks. The client device 116 can display multiple product defect analysis tasks generated by the product manufacturing message processing cluster 115 in the form of a list of task names in the task list area 803. The sorting of these product defect analysis tasks can vary according to predetermined rules.

For example, the top product defect analysis task is a currently processed task-product defect analysis task 1. Starting from the second product defect analysis task, the remaining product defect analysis tasks are automatically sorted based on product priority and time priority. Each product defect analysis task name in task list area 803 can represent a collection of multiple product defect analysis tasks for batch products in the same batch, or one product defect analysis task for a single product (glass). The task name can comprise a number representing a batch product or a single product, as well as a product type, which is not specifically limited in the disclosure. During the product manufacturing process, as products continuously pass through various sites, multiple product defect analysis tasks are generated in real-time. The number of names listed in the task list area 803 keeps increasing, and the order of the tasks may also change continuously due to factors such as priority.

The display is further configured to display task details of the current product defect analysis task, wherein the task details can be displayed in the task detail area 804. For example, the currently processed product defect analysis task is product defect analysis task 1. The task details comprise product information, site information, defect type information, and the like. The defect type information can be obtained through the recognition of the defect recognition model. The user can also click on any task name in the task list area 803, and the detailed information of the task will be displayed in the task detail area 804. If a product defect analysis task name contains multiple product defect analysis tasks for batch products, task details for each product can be displayed in the task detail area 804 one by one.

The client device 116 can further be configured to obtain an execution priority adjustment instruction for multiple product defect analysis tasks, the execution priority adjustment instruction being input by the user. Based on the adjustment instruction, the sorting of the product defect analysis tasks in the task list is changed. The user can input an execution priority adjustment instruction for multiple product defect analysis tasks to the client device 116 through a touch operation, a mouse operation, a keyboard input, or other operations. The client device 116 can also obtain an input of the priority adjustment instruction performed by other input methods. After obtaining the adjustment instruction, the client device 116 can adjust the execution order of the product defect analysis tasks in the product message manufacturing cluster 113, or adjust the order in which the product defect analysis tasks are executed by the client device 116. Based on the adjustment instruction, the sorting of the product defect analysis tasks in the task list area 803 displayed on the corresponding client device 116 is also changed accordingly.

For example, assuming that a user wants to adjust the execution order of a product defect analysis task, the user can drag the product defect analysis task in the task list area 803, for example, drag a product defect analysis task 2 in FIG. 12 and place it after a product defect analysis task 3, so that a priority of the product defect analysis task 2 is adjusted to be lower than a priority of the product defect analysis task 3. The client device 116 can capture an action of the user, thereby obtaining an execution priority adjustment instruction for multiple product defect analysis tasks. After obtaining the execution priority adjustment instruction, the client device 116 will modify the execution priority of one or more product defect analysis tasks in a plurality of product defect analysis tasks based on the adjustment instruction. In addition, the client device 116 modifies the sorting of the product defect analysis tasks in the task list area 803 based on the adjustment instruction. At this point, the product defect analysis task 3 will be displayed above the product task 2.

The user can also directly or indirectly set the priority of each product defect analysis task in other ways. For example, the user can assign high priority to product defect analysis tasks 2 to 5 by using a preset priority adjustment shortcut key or a preset priority adjustment button on the graphical interface 800. The client device 116 can obtain an execution priority adjustment instruction for a plurality of product defect analysis tasks through the priority adjustment button. After obtaining the execution priority adjustment instruction, the client device 116 will modify the execution priority of one or more product defect analysis tasks in the plurality of product defect analysis tasks based on the adjustment instruction. In addition, the client device 116 modifies the sorting of the product defect analysis tasks in the task list area 803 based on the adjustment instruction. For example, the client device 116 can display the product defect analysis tasks 2 to 5 fixedly at the top of task list area 803 until the product defect analysis tasks 2 to 5 are completed. Starting from product defect analysis task 6, the remaining product defect analysis tasks are sorted by product priority and time priority.

The display is further configured to display multiple thumbnails of the product image device, wherein the thumbnails can be displayed in the thumbnail area 807. The thumbnails in the thumbnail area 807 are only reduced in size compared to the product image in the product image area 801. Optionally, the product image in the product image area 801 may be an enlarged image of thumbnail 1. The user can click on any thumbnail to make the product image area 801 display an enlarged product image for the thumbnail. A thumbnail can be a thumbnail of a product image containing product defect recognition content or a thumbnail of a product image without product defect recognition content. The multiple thumbnails can be thumbnails of all product images of batch products in the current defect analysis task, or thumbnails of all product images of a single product, or thumbnails of all product images of the same defect type. Optionally, by clicking on a defect type listed for a single product in the task detail area 804, all thumbnails of the type will be displayed in the thumbnail area 807.

The display is configured to display multiple operation function buttons located in the operation function area 805. The client device obtains a start or end operation instruction input by the user. Based on the start operation instruction, the product manufacturing message processing cluster 115 starts transmitting the product defect analysis task or the defect recognition result to the client device 116. Based on the end operation instruction, the product manufacturing message processing cluster 115 stops transmitting the product defect analysis task or the defect recognition result to the client device. The client device 116 obtains an online or offline operation instruction input by the user. Based on the online operation instruction, the client device 116 can receive the product defect analysis task in real time. Based on the offline operation instruction, the client device 116 stops receiving the product defect analysis task, and the user can perform review or manual recognition operations for an unfinished product defect analysis task stored in the client device 116 in an offline state. The client device 116 can also perform a corresponding function based on another operation function instruction input by the user.

The display is further configured to display a task selection button located in the task selection area 806. The client device 116 obtains a selection for a task review function entered by the user (e.g., by the user clicking the AI button), and product images recognized by the server 110 are displayed in the corresponding task detail area 804, the thumbnail area 807, and the product image area 801 for review by the user. The client device 116 obtains a selection of a manual recognition function entered by the user (e.g., by the user clicking the OP button), and product images without product recognition content will be displayed in the corresponding task detail area 804, the thumbnail area 807, and the product image area 801 for manual recognition. The client device 116 can also obtain a selection for a skip function entered by the user, thereby skipping the images in the thumbnail area 807 for sampled review by the user.

Optionally, the display is further configured to display reference information associated with at least one product defect analysis task of a plurality of product defect analysis tasks. The reference information comprises: a standard product image and a product defect recognition standard. The client device 116 can display a product image associated with the currently processed product defect analysis task 1 in the product image area 801, and display a standard product image in a standard product image frame (not shown in the figure). The client device 116 can also display the product defect recognition standard in a product defect recognition standard frame (not shown in the figure). If there are multiple product images, the user can select a product image by clicking the previous/next button in the shortcut area 802. The user can also zoom in and out of the image in the product image area 801 and the standard product image frame through the zoom in and out buttons provided on the client device. By comparing the product image in the product image area 801 with the standard product image in the standard product image frame, the product defect content can be determined by a relevant staff in a more intuitive way.

Figure 13:
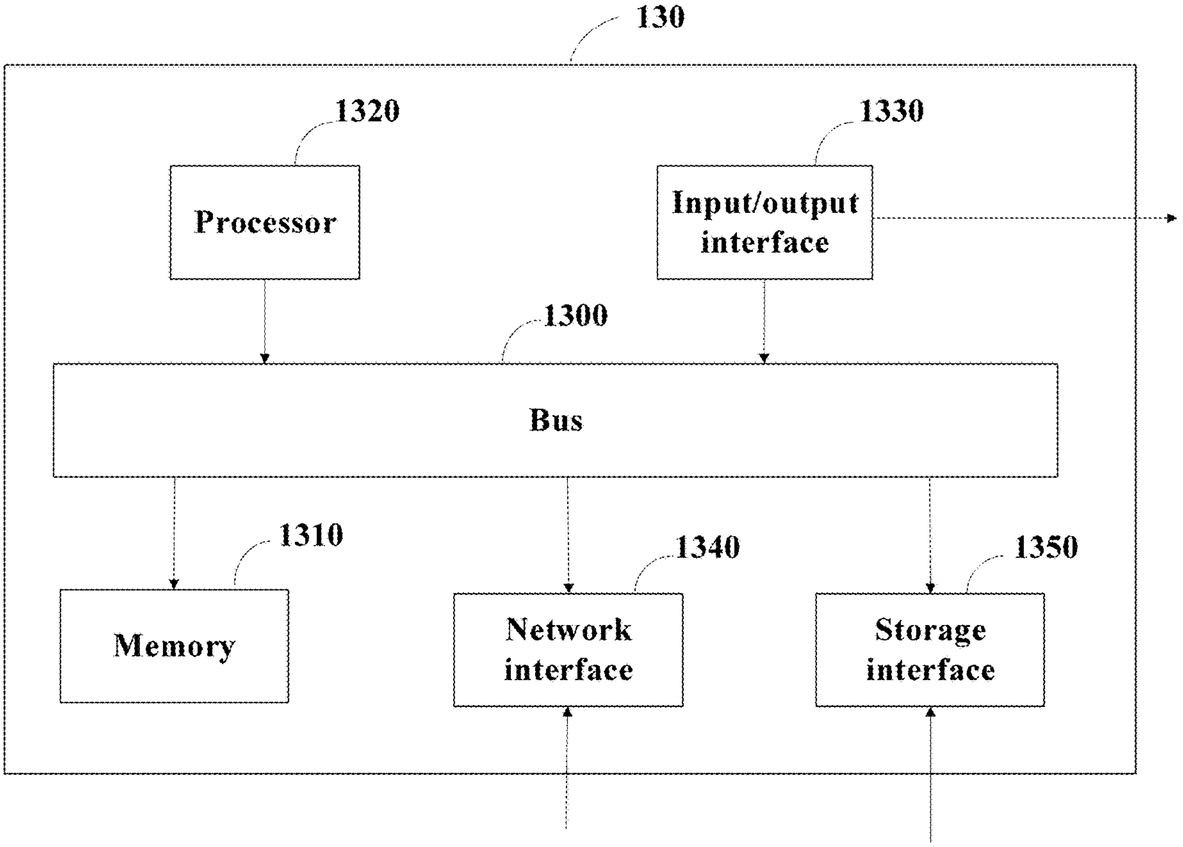
FIG. 13 is a block diagram showing a computer system for implementing some embodiments of the present disclosure.

FIG. 13 is a block diagram showing a computer system for implementing some embodiments of the present disclosure.

As shown in FIG. 13, a computer system 130 can be represented in the form of a general-purpose computing device. The computer system 130 comprises a memory 1310, a processor 1320, and a bus 1300 connecting different system components.

The memory 1310 may comprise, for example, a system memory, a non-volatile storage medium, or the like. The system memory stores, for example, an operating system, an application program, a boot loader, and other programs. The system memory may comprise a volatile storage medium such as random access memory (RAM) and/or cache memory. The non-volatile storage medium stores, for example, instructions for executing corresponding embodiments of at least one of the image recognition method or the training method. The non-volatile storage medium comprises, but not limited to, magnetic disk memory, optical memory, flash memory, or the like.

The processor 1320 may be implemented by discrete hardware components such as a general-purpose processor, a digital signal processor (DSP), an application specific integrated circuit (ASIC), a field programmable gate array (FPGA), or other programmable logic devices, discrete gates, or transistors. Accordingly, each module such as the judgment module and the determination module may be implemented by a central processing unit (CPU) running instructions in memory that execute the corresponding steps, or may be implemented by a dedicated circuit that executes the corresponding steps.

The bus 1300 may has any bus structure of a variety of bus structures. For example, the bus structure comprise, but are not limited to, an Industry Standard Architecture (ISA) bus, a Micro Channel Architecture (MAC) bus, or peripheral component interconnect (PCI) bus.

The computer system 130 may further comprise an input/output interface 1330, a network interface 1340, a storage interface 1350, and the like. These interfaces 1330, 1340, 1350, the memory 1310 and the processor 1320 may be connected through the bus 1300. The input/output interface 1330 may provide a connection interface for an input/output device such as a display, a mouse, a keyboard, or the like. The network interface 1340 provides a connection interface for various networked devices. The storage interface 1350 provides a connection interface for an external storage device such as a floppy disk, a USB flash disk, an SD card, or the like.

Herein, various aspects of the present disclosure are described with reference to flowcharts and/or block diagrams of methods, devices and computer program products according to embodiments of the present disclosure. It should be understood that each block of the flowcharts and/or block diagrams and any combination of the blocks can be implemented by computer-readable program instructions.

These computer program instructions may be provided to a processor of a general purpose computer, a special purpose computer, or other programmable device to generate a machine such that the instructions executed by the processor generate a device implementing the functions specified in one or more blocks of the flowcharts and/or the block diagrams.

These computer-readable program instructions may also be stored in a computer-readable storage, and cause a computer to operate in a specific manner to produce a manufactured article comprising instructions to implement the functions specified in one or more blocks of the flowcharts and/or the block diagrams.

The present disclosure can take the form of an entirely hardware embodiment, an entirely software embodiment or an embodiment containing both hardware and software elements.

With the image recognition method for a display panel and the system, the training method for an image recognition model, the electronic device, and the computer storage medium provided in the above embodiments, the accuracy of recognizing the defect in the image of the display panel can be improved.

Heretofore, the image recognition method for a display panel and the system, the training method for an image recognition model, the electronic device, and the computer storage medium according to the present disclosure have been described in detail. In order to avoid obscuring the concepts of the present disclosure, some details known in the art are not described. Based on the above description, those skilled in the art can understand how to implement the technical solutions disclosed herein.

What is claimed is:

1. An image recognition method for a display panel, comprising:

obtaining an image of the display panel, wherein the image of the display panel comprises a plurality of gate lines and a plurality of data lines, the plurality of gate lines extending in a first direction, the plurality of data lines extending in a second direction different from the first direction, and the plurality of gate lines and the plurality of data lines intersecting to define a plurality of sub-pixel regions, and the image of the display panel further comprises a defect pattern, the defect pattern being in one or more of the plurality of sub-pixel regions; and recognizing the defect pattern in the image of the display panel by using an image recognition model to obtain defect information, comprising:

performing dimensionality reduction processing on the image of the display panel to obtain a pixel encoding of the image of the display panel, the pixel encoding representing a pixel feature of the image of the display panel;

determining a position encoding of the image of the display panel, the position encoding representing a positional relationship feature between different pixels in the image of the display panel;

determining a feature encoding of the image of the display panel based on the pixel encoding and the position encoding, the feature encoding integrating the pixel feature of the image of the display panel and the positional relationship feature between the different pixels;

processing the feature encoding by using a first attention model to obtain an output of the first attention model, the first attention model being configured to learn a weight proportion of the feature of the defect pattern in the image of the display panel based on the pixel feature of the image of the display panel and the positional relationship feature between the different pixels; and determining the defect information based on the output of the first attention model, wherein the defect information comprises at least one of a defect type or a defect position of the defect pattern, wherein the image recognition model comprises the first attention model.

2. The image recognition method according to claim 1, wherein the performing of the dimensionality reduction processing on the image of the display panel to obtain the pixel encoding of the image of the display panel comprises:

partitioning the image of the display panel to obtain a plurality of sub-images; and performing linear embedding on each of the plurality of sub-images to obtain a sequence comprising a pixel sub-encoding of the each of the plurality of sub-images, the sequence being used as the pixel encoding of the image of the display panel.

3. The image recognition method according to claim 2, wherein the partitioning of the image of the display panel to obtain a plurality of sub-images comprises:

partitioning the image of the display panel based on the plurality of sub-pixel regions to obtain the plurality of sub-images.

4. The image recognition method according to claim 1, wherein the performing of the dimensionality reduction processing on the image of the display panel to obtain the pixel encoding of the image of the display panel comprises:

performing feature extraction on the image of the display panel by using a neural network model to obtain a multi-channel feature map of the image of the display panel; and performing dimensionality reduction processing on each channel of the multi-channel feature map to obtain a sequence comprising a plurality of pixel sub-encodings, the sequence being used as the pixel encoding of the image of the display panel.

5. The image recognition method according to claim 1, wherein:

the image recognition model comprises an encoding layer, the encoding layer comprising the first attention model, and the image recognition model further comprises a decoding layer; and the determining the defect information based on the output of the first attention model comprises:

determining, based on an output of the first attention model, an output of the encoding layer as an input to the decoding layer;

initializing randomly a plurality of candidate boxes;

processing the output of the encoding layer and the plurality of candidate boxes by using the decoding layer to obtain an output of the decoding layer; and determining the defect information based on the output of the decoding layer.

6. The image recognition method according to claim 5, wherein:

the decoding layer comprises a second attention model and a third attention model; and the processing of the output of the encoding layer and the plurality of candidate boxes by using the decoding layer to obtain the output of the decoding layer comprises:

performing linear transformation on the plurality of candidate boxes by using the second attention model to obtain a first vector matrix and a second vector matrix in the second attention model;

determining a third vector matrix in the second attention model based on the first vector matrix and the second vector matrix in the second attention model;

determining an output of the second attention model based on the third vector matrix in the second attention model;

performing linear transformation on the output of the second attention model by using the third attention model to obtain a first vector matrix in the third attention model;

performing linear transformation on the output of the encoding layer to obtain a second vector matrix in the third attention model;

determining a third vector matrix in the third attention model based on the first vector matrix and the second vector matrix in the third attention model, the third vector matrix in the third attention model representing the weight proportion of the feature of the defect pattern in the image of the display panel; and determining the output of the decoding layer based on the third vector matrix in the third attention model.

7. The image recognition method according to claim 5, wherein:

the output of the decoding layer comprises a plurality of decoding features in a same number as the plurality of candidate boxes, and the image recognition model further comprises a plurality of feedforward neural networks in a same number as the plurality of candidate boxes; and the determining of the defect information based on the output of the decoding layer comprises:

inputting the plurality of decoding features into the plurality of feedforward neural networks in one-to-one correspondence to obtain the defect information.

8. The image recognition method according to claim 1, wherein:

the determining of the position encoding of the image of the display panel comprises:

determining single-dimensional position encodings of the image of the display panel in different dimensional directions; and concatenating the single-dimensional position encodings of the image of the display panel in the different dimensional directions to obtain the position encoding of the image of the display panel; or the position encoding is a fixed position encoding or a relative position encoding; or the recognizing of the defect pattern in the image of the display panel by using the image recognition model to obtain the defect information further comprises: reducing resolution of the image of the display panel before performing the dimensionality reduction processing on the image of the display panel to enable the resolution of the image of the display panel to be within a preset resolution range.

9. The image recognition method according to claim 1, wherein the processing of the feature encoding by using the first attention model to obtain the output of the first attention model comprises:

obtaining, based on the feature encoding, a correlation matrix of the feature encoding by using the first attention model, the correlation matrix representing the weight proportion of the feature of the defect pattern in the image of the display panel;

determining the output of the first attention model based on the correlation matrix.

10. The image recognition method according to claim 9, wherein the obtaining of, based on the feature encoding, the correlation matrix of the feature encoding by using the first attention model comprises:

performing linear transformation on the feature encoding by using the first attention model to obtain a first vector matrix and a second vector matrix;

determining a third vector matrix based on the first vector matrix and the second vector matrix, the third vector matrix representing the weight proportion of the feature of the defect pattern in the image of the display panel; and determining the correlation matrix based on the third vector matrix.

11. The image recognition method according to claim 1, wherein the defect information of the image of the display panel is represented as an encoding sequence, for any position in the encoding sequence, an encoding value of a first value indicating that a defect type corresponding to the any position belongs to a defect type for which the defect pattern is recognized, and an encoding value of a second value indicating that a defect type corresponding to the any position does not belong to the defect type for which the defect pattern is recognized.

12. The image recognition method according to claim 11, wherein:

the image of the display panel comprises a plurality of defect patterns, the plurality of defect patterns being recognized as belonging to different defect types, and the encoding sequence comprises a plurality of first values; or the image of the display panel comprises one or more defect patterns, the one or more defect patterns being recognized as belonging to a same defect type, and the encoding sequence comprises one first value.

13. The image recognition method according to claim 2, wherein:

the image recognition model comprises an encoding layer, the encoding layer comprising the first attention model, and the image recognition model further comprise a fully connected layer;

the determining of the defect information based on the output of the first attention model comprises:

determining an output of the encoding layer based on an output of the first attention model; and determining, based on the output of the encoding layer, the defect information by using the fully connected layer.

14. The image recognition method according to claim 13, wherein:

the output of the encoding layer comprises an output of the encoding layer for each of the plurality of sub-images; and the determining of, based on the output of the encoding layer, the defect information by using the fully connected layer comprises:

calculating an average value of outputs of the encoding layer for the plurality of sub-images; and processing the average value of the outputs of the encoding layer for the plurality of sub-images by using the fully connected layer to obtain the defect information; or the determining of the feature encoding of the image of the display panel based on the pixel encoding and the position encoding comprises:

initializing randomly a classification reference encoding, the classification reference encoding being independent of the image of the display panel;

concatenating the classification reference encoding and the pixel encoding to obtain a composite encoding;

determining the feature encoding of the image of the display panel based on the composite encoding and the position encoding; wherein:

the output of the encoding layer comprises an output of the encoding layer for the classification reference encoding and each of the plurality of sub-images, and the determining of, based on the output of the encoding layer, the defect information by using the fully connected layer comprises: processing the output of the encoding layer for the classification reference encoding by using the fully connected layer to obtain the defect information.

15. The image recognition method according to claim 13, wherein:

the encoding layer comprises a plurality of encoders connected in series, each of the plurality of encoders comprising one first attention model, and an input of a first encoder being the feature encoding;

the encoding layer further comprises a plurality of linear layers, at least one encoder of the plurality of encoders being followed in series by at least one linear layer of the plurality of linear layers, the at least one linear layer being configured to perform compression on a scale of an output of the at least one encoder corresponding to the at least one linear layer, and an input of another encoder other than the first encoder being an output of an encoder or an linear layer directly preceding the another encoder in series;

the determining of the output of the encoding layer based on the output of the first attention model comprises:

performing, for the at least one linear layer connected in series after the at least one encoder, compression on a scale of an output of a last one of the at least one encoder to obtain an output of the at least one linear layer as an input of an encoder directly connected in series after the at least one linear layer;

determining, for each encoder of the plurality of encoders, an output of the each encoder based on an output of the first attention model in the each encoder; and determining an output of an encoder directly connected in series before a linear layer of the plurality of linear layers and an output of the last one of the plurality of encoders as the output of the encoding layer; and the determining of, based on the output of the encoding layer, the defect information by using the fully connected layer comprises:

performing feature fusion on the output of the encoder directly connected in series before the linear layer of the plurality of linear layers and the output of the last one of the plurality of encoders by using a feature pyramid algorithm; and determining, based on an result of the feature fusion, the defect information by using the fully connected layer.

16. A training method for an image recognition model of a display panel, comprising:

obtaining an image of the display panel and annotation data of the image, wherein the image of the display panel comprises a plurality of gate lines and a plurality of data lines, the plurality of gate lines extending in a first direction, the plurality of data lines extending in a second direction different from the first direction, and the plurality of gate lines and the plurality of data lines intersecting to define a plurality of sub-pixel regions, the image of the display panel further comprises a defect pattern, the defect pattern being in one or more of the plurality of sub-pixel regions, and the annotation data comprises at least one of an actual defect type or an actual defect position of the defect pattern;

recognizing the defect pattern in the image of the display panel by using the image recognition model to obtain defect information, comprising:

performing dimensionality reduction processing on the image of the display panel to obtain a pixel encoding of the image of the display panel, the pixel encoding representing a pixel feature of the image of the display panel;

determining a position encoding of the image of the display panel, the position encoding representing a positional relationship feature between different pixels in the image of the display panel;

determining a feature encoding of the image of the display panel based on the pixel encoding and the position encoding, the feature encoding integrating the pixel feature of the image of the display panel and the positional relationship feature between the different pixels;

processing the feature encoding by using a first attention model to obtain an output of the first attention model, the first attention model being configured to learn a weight proportion of the feature of the defect pattern in the image of the display panel based on the pixel feature of the image of the display panel and the positional relationship feature between the different pixels; and determining the defect information based on the output of the first attention model, wherein the defect information comprises at least one of a defect type or a defect position of the defect pattern, wherein the image recognition model comprises the first attention model; and training the image recognition model based on the defect information and the annotation data to obtain a trained image recognition model.

17. An electronic device, comprising:

a memory; and a processor coupled to the memory, the processor being configured to, based on instructions stored in the memory, perform the image recognition method according to claim 1.

18. An image recognition system for a display panel, comprising: a server configured to:

obtain an image of the display panel, wherein the image of the display panel comprises a plurality of gate lines and a plurality of data lines, the plurality of gate lines extending in a first direction, the plurality of data lines extending in a second direction different from the first direction, and the plurality of gate lines and the plurality of data lines intersecting to define a plurality of sub-pixel regions, and the image of the display panel further comprises a defect pattern, the defect pattern being in one or more of the plurality of sub-pixel regions; and recognize the defect pattern in the image of the display panel by using an image recognition model to obtain defect information, wherein the server is configured to:

perform dimensionality reduction processing on the image of the display panel to obtain a pixel encoding of the image of the display panel, the pixel encoding representing a pixel feature of the image of the display panel;

determine a position encoding of the image of the display panel, the position encoding representing a positional relationship feature between different pixels in the image of the display panel;

determine a feature encoding of the image of the display panel based on the pixel encoding and the position encoding, the feature encoding integrating the pixel feature of the image of the display panel and the positional relationship feature between the different pixels;

process the feature encoding by using a first attention model to obtain an output of the first attention model, the first attention model being configured to learn a weight proportion of the feature of the defect pattern in the image of the display panel based on the pixel feature of the image of the display panel and the positional relationship feature between the different pixels; and determine the defect information based on the output of the first attention model, wherein the defect information comprises at least one of a defect type or a defect position of the defect pattern, wherein the image recognition model comprises the first attention model.

19. A non-transitory computer-readable storage medium having computer program instructions stored thereon, wherein the computer program instructions, when executed by a processor, implement the image recognition method according to claim 1.

* * * * *